(12) United States Patent
Pascucci

(10) Patent No.: US 8,836,714 B2
(45) Date of Patent: Sep. 16, 2014

(54) RAPID, INTERACTIVE EDITING OF MASSIVE IMAGERY DATA

(75) Inventor: Valerio Pascucci, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 944 days.

(21) Appl. No.: 12/915,367

(22) Filed: Oct. 29, 2010

(65) Prior Publication Data

US 2012/0105469 A1 May 3, 2012

(51) Int. Cl.
| | |
|---|---|
| G06T 17/00 | (2006.01) |
| G09G 5/00 | (2006.01) |
| G09G 5/02 | (2006.01) |
| H04N 11/02 | (2006.01) |
| H04N 5/46 | (2006.01) |
| G06F 15/00 | (2006.01) |
| G03F 3/08 | (2006.01) |
| H04N 1/46 | (2006.01) |
| H04N 1/40 | (2006.01) |
| G06K 9/00 | (2006.01) |
| G06K 9/40 | (2006.01) |
| G06K 9/36 | (2006.01) |
| G06T 3/40 | (2006.01) |
| G06K 9/32 | (2006.01) |

(52) U.S. Cl.
CPC ........................................ *G06T 3/40* (2013.01)
USPC ........... 345/589; 345/428; 345/581; 345/586; 345/600; 345/619; 348/405.1; 348/557; 348/561; 358/1.2; 358/518; 358/537; 358/448; 382/167; 382/254; 382/276; 382/299

(58) Field of Classification Search
USPC ......... 345/428, 581, 589, 586, 600, 606, 611, 345/616, 618–619, 629–630, 643, 660, 665, 345/670, 472–473, 690, 698; 348/252–256, 348/405, 552–553, 557, 560–561, 563–564, 348/581–582, 240.2, 251; 38/1.2, 1.9, 3.27, 38/518–519, 537–538, 540, 448, 38/451–453; 382/162, 167, 254, 266, 269, 382/274, 276, 279, 299–300
See application file for complete search history.

(56) References Cited

U.S. PATENT DOCUMENTS 6,292,218 B1 * 9/2001 Parulski et al. ............. 348/220.1
6,704,048 B1 * 3/2004 Malkin et al. .............. 348/240.2

(Continued)

OTHER PUBLICATIONS

Bornemann et al., Classical and Cascadic Multigrid—A Methodical Comparison, Konrad-Zuse-Zentrum Berlin, Aug. 1996, pp. 1-10, to appear in Proceedings of the 9th International Conference on Domain Decomposition, Bergen, Norway.

(Continued)

*Primary Examiner* — Wesner Sajous
(74) *Attorney, Agent, or Firm* — Bell & Manning, LLC

(57) ABSTRACT

A method, a system, and a computer-readable medium are provided which provide interactive editing of image data. Image data is sampled, by a computing device, at a first resolution. The first resolution is lower than a full resolution of the image data. Gradients for the sampled image data are calculated by the computing device. The computing device solves a system equation for color pixel data for each pixel of the sampled image data using the sampled image data and the calculated gradients. The computing device controls a display of the color pixel data on a display.

16 Claims, 24 Drawing Sheets

(56) References Cited

U.S. PATENT DOCUMENTS

| | | | |
|---|---|---|---|
| 6,775,399 B1* | 8/2004 | Jiang | 382/128 |
| 7,428,737 B1 | 9/2008 | Borghesani et al. | |
| 2002/0136446 A1* | 9/2002 | Slavin | 382/162 |
| 2003/0137528 A1* | 7/2003 | Wasserman et al. | 345/700 |
| 2004/0190792 A1* | 9/2004 | Slavin | 382/299 |
| 2004/0207881 A1* | 10/2004 | Nomura | 358/3.24 |
| 2005/0018223 A1 | 1/2005 | Debevec et al. | |
| 2005/0237341 A1 | 10/2005 | Gangnet et al. | |
| 2006/0078206 A1* | 4/2006 | Mishima et al. | 382/209 |
| 2006/0271871 A1 | 11/2006 | Blaukopf et al. | |
| 2007/0206008 A1* | 9/2007 | Kaufman et al. | 345/424 |
| 2007/0271224 A1 | 11/2007 | Essafi et al. | |
| 2008/0095028 A1 | 4/2008 | Seo et al. | |
| 2008/0143744 A1* | 6/2008 | Agarwala | 345/629 |
| 2008/0144079 A1 | 6/2008 | Pandey et al. | |
| 2008/0267499 A1* | 10/2008 | Deischinger et al. | 382/173 |
| 2009/0043978 A1 | 2/2009 | Sawdon et al. | |
| 2009/0287702 A1 | 11/2009 | Pascucci | |
| 2010/0124371 A1* | 5/2010 | Jiang et al. | 382/162 |
| 2012/0008021 A1* | 1/2012 | Zhang et al. | 348/251 |
| 2012/0200665 A1* | 8/2012 | Furumura et al. | 348/36 |
| 2012/0237136 A1* | 9/2012 | Rempel et al. | 382/264 |

OTHER PUBLICATIONS

Kopf et al., Capturing and Viewing Gigapixel Images, ACM Transactions on Graphics, Proceedings of SIGGRAPH 2007, vol. 26, No. 3.

Kazhdan et al., Streaming Multigrid for Gradient-Domain Operations on Large Images, ACM Transactions on Graphics, Aug. 2008, vol. 27, No. 3, Proceedings of ACM SIGGRAPH 2008.

Lischinski et al., Interactive Local Adjustment of Tonal Values, ACM Transactions on Graphics, 2006.

Bolitho et al., Multilevel Streaming for Out-of-Core Surface Reconstruction, Eurographics Symposium on Geometry Processing 2007, The Eurographics Association.

International Search Report and Written Opinion received in PCT/US2011/058543, Apr. 23, 2012.

Non-Final Office Action issued by the USPTO in U.S. Appl. No. 12/466,488, Dec. 4, 2012.

Non-final office action received in U.S. Appl. No. 12/466,488, Oct. 26, 2011.

Pascucci et al., Global Static Indexing for Real-Time Exploration of Very Large Rectangular Grids, Nov. 2001, pp. 1-8.

Pascucci et al., Hierarchical Indexing for Out-Of-Core Access to Multi-Resolution Data, 2002, pp. 225-241.

* cited by examiner

| Sample index | Z-order | Binary representation | |
|---|---|---|---|
| | | i | j |
| 0 | 0000 | 00 | 00 |
| 1 | 0001 | 01 | 00 |
| 2 | 0010 | 00 | 01 |
| 3 | 0011 | 01 | 01 |
| 4 | 0100 | 10 | 00 |
| 5 | 0101 | 11 | 00 |
| 6 | 0110 | 10 | 01 |
| 7 | 0111 | 11 | 01 |
| 8 | 1000 | 00 | 10 |
| 9 | 1001 | 01 | 10 |
| 10 | 1010 | 00 | 11 |
| 11 | 1011 | 01 | 11 |
| 12 | 1100 | 10 | 10 |
| 13 | 1101 | 11 | 10 |
| 14 | 1110 | 10 | 11 |
| 15 | 1111 | 11 | 11 |

Fig. 6

| Sample index | Binary representation | | | | Level of resolution |
|---|---|---|---|---|---|
| | HZ-order | Z-order | i | j | |
| 0 | 0000 | 0000 | 00 | 00 | 0 |
| 1 | 0001 | 1000 | 00 | 10 | 1 |
| 2 | 0010 | 0100 | 10 | 00 | 2 |
| 3 | 0011 | 1100 | 10 | 10 | 2 |
| 4 | 0100 | 0010 | 00 | 01 | 3 |
| 5 | 0101 | 0110 | 10 | 01 | 3 |
| 6 | 0110 | 1010 | 00 | 11 | 3 |
| 7 | 0111 | 1110 | 10 | 11 | 3 |
| 8 | 1000 | 0001 | 01 | 00 | 4 |
| 9 | 1001 | 0011 | 01 | 01 | 4 |
| 10 | 1010 | 0101 | 11 | 00 | 4 |
| 11 | 1011 | 0111 | 11 | 01 | 4 |
| 12 | 1100 | 1001 | 01 | 10 | 4 |
| 13 | 1101 | 1011 | 11 | 10 | 4 |
| 14 | 1110 | 1101 | 01 | 11 | 4 |
| 15 | 1111 | 1111 | 11 | 11 | 4 |

Fig. 7

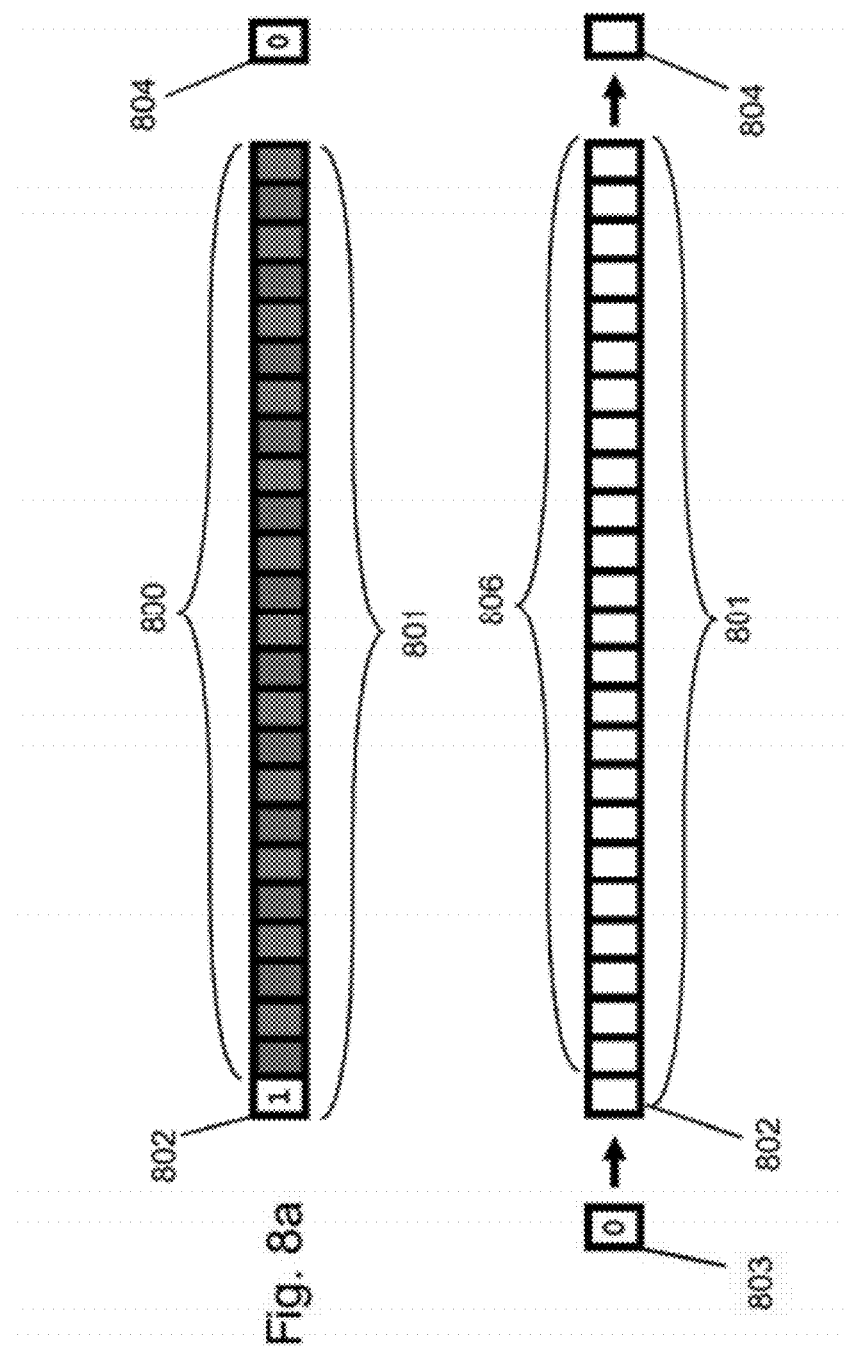

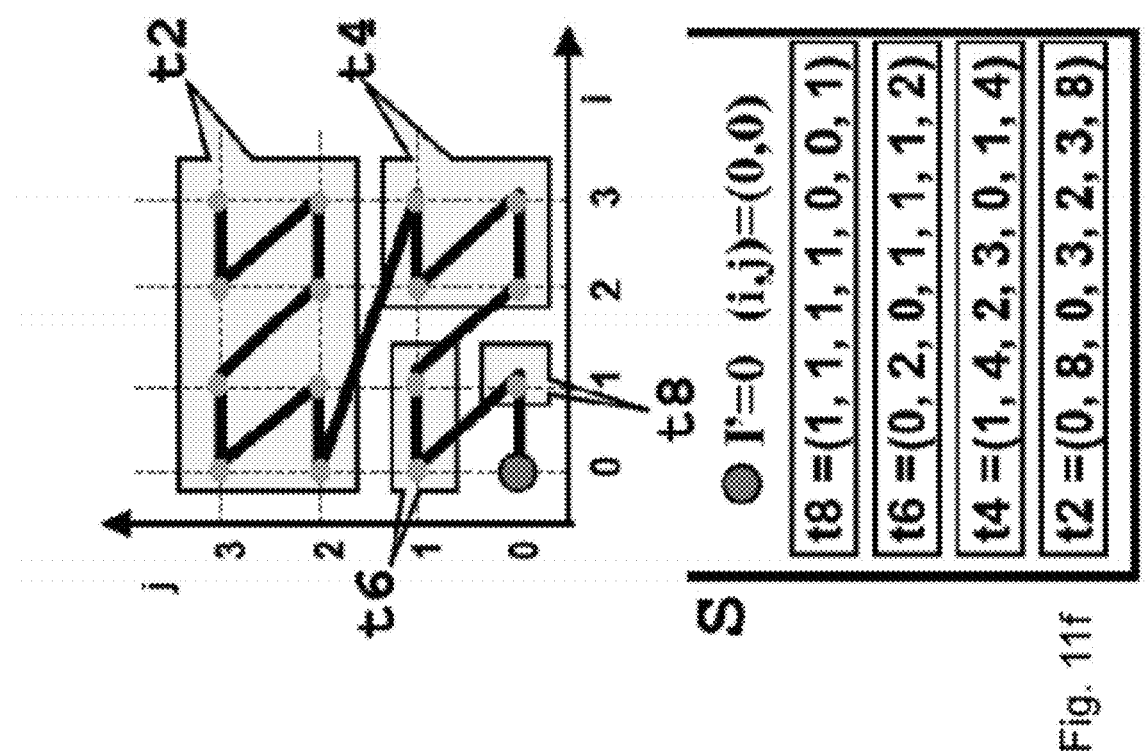

RAPID, INTERACTIVE EDITING OF MASSIVE IMAGERY DATA

BACKGROUND

Gigapixel and larger images are becoming increasingly popular due to the availability of high-resolution cameras and inexpensive robots for the automatic capture of large image collections. These tools simplify the acquisition of large stitched panoramas that are becoming easily accessible over the Internet. Even more massive images from aerial satellite photography are freely distributed, e.g. from the USGS website. At the same time, computed tomography (CT) and microscopy scans allow acquisition of massive three-dimensional (3D) images for mechanical engineering applications or reconstruction of biological structures. The full potential of such imagery may only be realized by scientists or artists by enhancing, manipulating, and/or compositing the original images. However, using the combined panoramas typically requires offline processing to reduce varying lighting and coloring artifacts or to perform other editing or analysis on the data sets because the real time processing of very large volumetric meshes introduces specific algorithmic challenges due to the impossibility of fitting the input data into the main (in-core) memory of a computer. The basic assumption of uniform-constant-time access to each memory location is not valid because part of the data is stored out-of-core or in external memory. The performance of most algorithms does not scale well in the transition from the in-core to the out-of-core processing conditions. The performance degradation is due to the high frequency of input/output operations that may dominate the overall run time. Thus, because of the large data set sizes, enhancing, manipulating, and/or compositing the images or otherwise analyzing the data is computationally expensive.

SUMMARY

In an example embodiment, a method for interactive editing of image data is provided. Image data is sampled, by a computing device, at a first resolution. The first resolution is lower than a full resolution of the image data. Gradients for the sampled image data are calculated by the computing device. The computing device solves a system equation for color pixel data for each pixel of the sampled image data using the sampled image data and the calculated gradients. The computing device controls a display of the color pixel data on a display.

In another example embodiment, a computer-readable medium is provided having stored thereon computer-readable instructions that, when executed by a computing device, cause the computing device to perform the method of interactive editing of image data.

In yet another example embodiment, a system is provided. The system includes, but is not limited to, a processor and the computer-readable medium operably coupled to the processor. As used herein, the term "operably coupled" indicates two components are electrically, mechanically, or electromechanically connected either directly or indirectly through other intermediate devices. The computer-readable medium has instructions stored thereon that, when executed by the processor, cause the system to perform the method of interactive editing of image data.

Other principal features and advantages of the invention will become apparent to those skilled in the art upon review of the following drawings, the detailed description, and the appended claims.

BRIEF DESCRIPTION OF THE DRAWINGS

Example embodiments of the invention will hereafter be described with reference to the accompanying drawings, wherein like numerals denote like elements.

FIG. 6 depicts a table mapping from row-major index (i, j) to the z-order index I.

FIG. 7 depicts a table mapping from row-major index (i, j) to the z-order index I and to the hierarchical z-order index $I^h$.

FIGS. 8a and 8b depict a graph of an address transformation from z-order index I to the hierarchical z-order index $I^h$.

FIGS. 11a-11j depict a process for z-order traversal of the two-dimensional array of FIG. 4 with concurrent index computation in accordance with an example embodiment.

DETAILED DESCRIPTION

Figure 1:
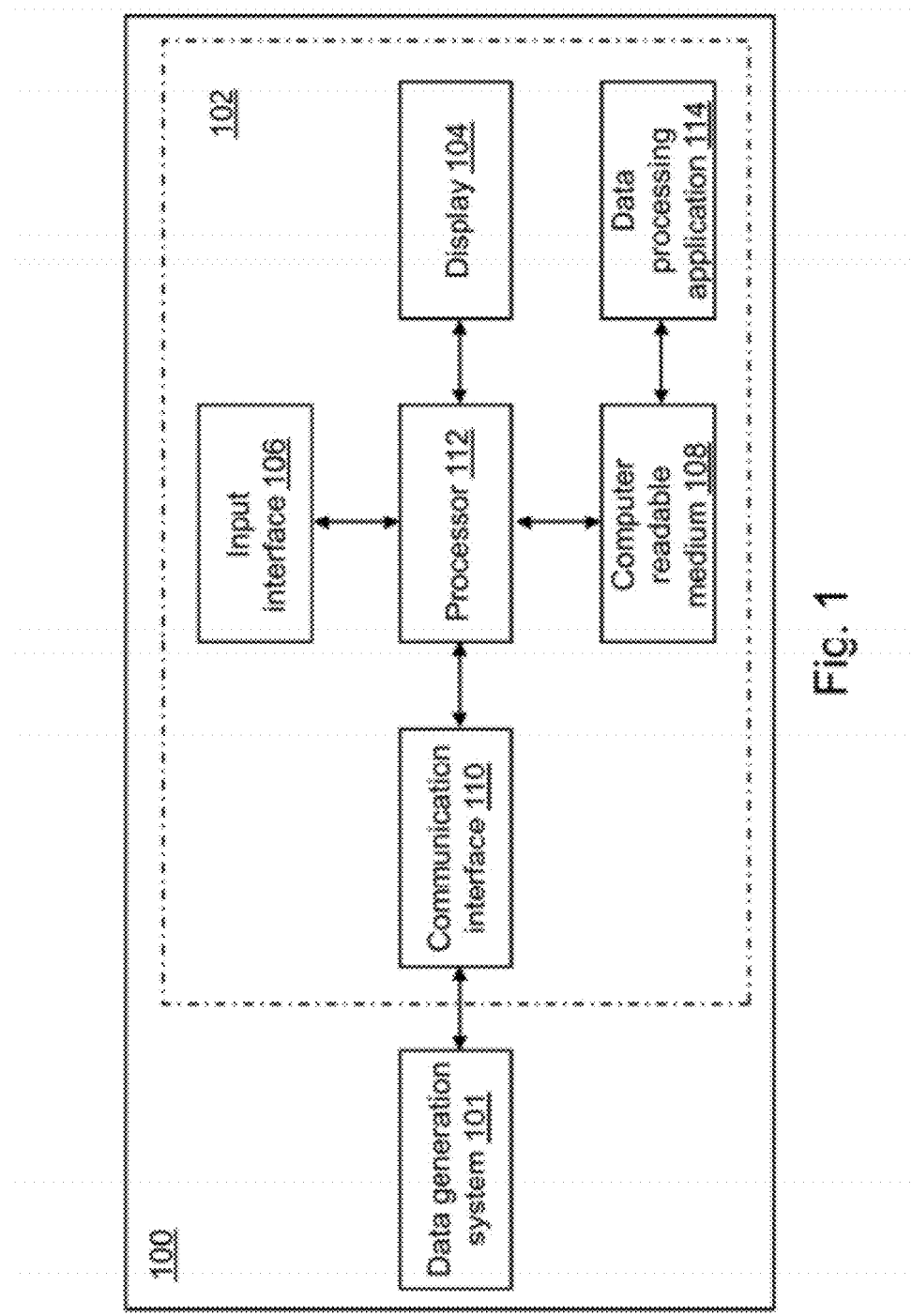
FIG. 1 depicts a block diagram of a data processing system in accordance with an example embodiment.

With reference to FIG. 1, a block diagram of a data processing system 100 is shown in accordance with an example embodiment. Data processing system 100 may include a data generation system 101 and a computing device 102. Computing device 102 may include a display 104, an input interface 106, a computer-readable medium 108, a communication interface 110, a processor 112, and a data processing application 114. In the embodiment illustrated in FIG. 1, data generation system 101 generates data related to a physical entity in two-dimensions, three-dimensions, four-dimensions, etc. In an example embodiment, the data is obtained from a sensor such as a radar, an infrared sensor, an optical sensor, etc. For example, the sensor may be a panoramic camera that obtains two-dimensional data from a vantage point on the earth's surface such as of a city. Alternatively, the sensor may be a satellite based synthetic aperture radar that obtains three-dimensional terrain data of the earth's surface. As another alternative, the sensor may be an infrared sensor that obtains thermal data of the earth's surface. As yet another alternative, the sensor may be part of a medical imaging system such as a magnetic resonance imaging device, a computed tomography scanner, etc. The source of and the dimensionality of the data is not intended to be limiting.

Computing device 102 may be a computer of any form factor. Different and additional components may be incorporated into computing device 102. Display 104 presents information to a user of computing device 102 as known to those skilled in the art. For example, display 104 may be a thin film transistor display, a light emitting diode display, a liquid crystal display, or any of a variety of different displays known to those skilled in the art.

Input interface 106 provides an interface for receiving information from the user for entry into computing device 102 as known to those skilled in the art. Input interface 106 may use various input technologies including, but not limited to, a keyboard, a pen and touch screen, a mouse, a track ball, a touch screen, a keypad, one or more buttons, etc. to allow the user to enter information into computing device 102 or to make selections presented in a user interface displayed on display 104. Input interface 106 may provide both an input and an output interface. For example, a touch screen both allows user input and presents output to the user. Computing device 102 may have one or more input interfaces that use the same or a different input interface technology.

Computer-readable medium 108 is an electronic holding place or storage for information so that the information can be accessed by processor 112 as known to those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. Computing device 102 may have one or more computer-readable media that use the same or a different memory media technology. Computing device 102 also may have one or more drives that support the loading of a memory media such as a CD or DVD.

Computer-readable medium 108 may comprise a cache in which data can be stored temporarily for rapid access by processor 112. Computer-readable medium 108 further may comprise a file system in which data files are stored and organized for access by processor 112. Thus, computer-readable medium 108 may include both in-core and out-of-core memory. In-core memory is a main memory of computing device 102 that is rapidly accessed by processor 112 such as a type of RAM. Out-of-core memory is a slower bulk memory such as a magnetic storage device, an optical disk, etc.

Communication interface 110 provides an interface for receiving and transmitting data between devices using various protocols, transmission technologies, and media as known to those skilled in the art. The communication interface may support communication using various transmission media that may be wired or wireless. Computing device 102 may have one or more communication interfaces that use the same or a different communication interface technology. Data may be transferred between computing device 102 and data generation system 101 using communication interface 110. Additionally, communication interface 110 may provide connectivity to other systems. For example, communication interface 110 may provide connectivity to a remote file system or database.

Processor 112 executes instructions as known to those skilled in the art. The instructions may be carried out by a special purpose computer, logic circuits, or hardware circuits. Thus, processor 112 may be implemented in hardware, firmware, or any combination of these methods including software installed on computer-readable medium 108. The term "execution" is the process of running an application or the carrying out of the operation called for by an instruction. The instructions may be written using one or more programming language, scripting language, assembly language, etc. Processor 112 executes an instruction, meaning that it performs and/or controls performance of the operations called for by that instruction. Processor 112 operably couples with display 104, with input interface 106, with computer-readable medium 108, and with communication interface 110 to receive, to send, and to process information. Processor 112 may retrieve a set of instructions from a permanent memory device and copy the instructions in an executable form to a temporary memory device that is generally some form of RAM. Computing device 102 may include a plurality of processors that use the same or a different processing technology.

Data processing application 114 performs operations associated with processing data generated by data generation system 101 such as constructing an image from imaging data such as optical data obtained from a camera. Some or all of the operations described may be embodied in data processing application 114. The operations may be implemented using hardware, firmware, software, or any combination of these methods. With reference to the example embodiment of FIG. 1, data processing application 114 is implemented in software stored in computer-readable medium 108 and accessible by processor 112 for execution of the instructions that embody the operations of data processing application 114. Data processing application 114 may be written using one or more programming languages, assembly languages, scripting languages, etc. As known to those skilled in the art, data processing application 114 may be implemented as a plug-in to a second data processing application.

Components of data processing system 100 may be positioned in a single location, a single facility, and/or may be remote from one another. Data generation system 101 and computing device 102 may be integrated into a single system. Data generation system 101 and computing device 102 may be connected directly. For example, data generation system 101 may connect to computing device 102 using a cable for transmitting information between data generation system 101 and computing device 102. Data generation system 101 may connect to computing device 102 using a network. Data may be stored electronically and accessed using computing device 102. Data generation system 101 and computing device 102 may not be connected. Instead, the data acquired using data generation system 101 may be manually provided to computing device 102. For example, the data may be stored on electronic media such as a CD, a DVD, a flash drive, etc. After receiving the data, computing device 102 may initiate processing of the data automatically or under control of a user of computing device 102.

Figure 2:
FIG. 2 depicts a first flow diagram illustrating first example operations performed by the data processing system of FIG. 1 in accordance with an example embodiment.

With reference to FIG. 2, example operations associated with data processing application 114 of FIG. 1 are described. Additional, fewer, or different operations may be performed, depending on the embodiment. The order of presentation of the operations of FIG. 2 is not intended to be limiting. Thus, although some of the operational flows are presented in sequence, the various operations may be performed in various repetitions, concurrently, and/or in other orders than those that are illustrated. In an operation 200, image data is received. For example, the image data may be stored at computing device 102 and selected for input to data processing application 114 which receives the image data as an input. As another alternative, the image data may be streamed to computing device 102 from data generation system 101. The image data may be defined in a variety of formats including a raw image format as understood by a person of skill in the art.

In an operation 202, an array of data is defined from the image data. In an example embodiment, the array is defined in row-major order though this is not required and other traversal orders may be used in defining the array of data.

Figure 4:
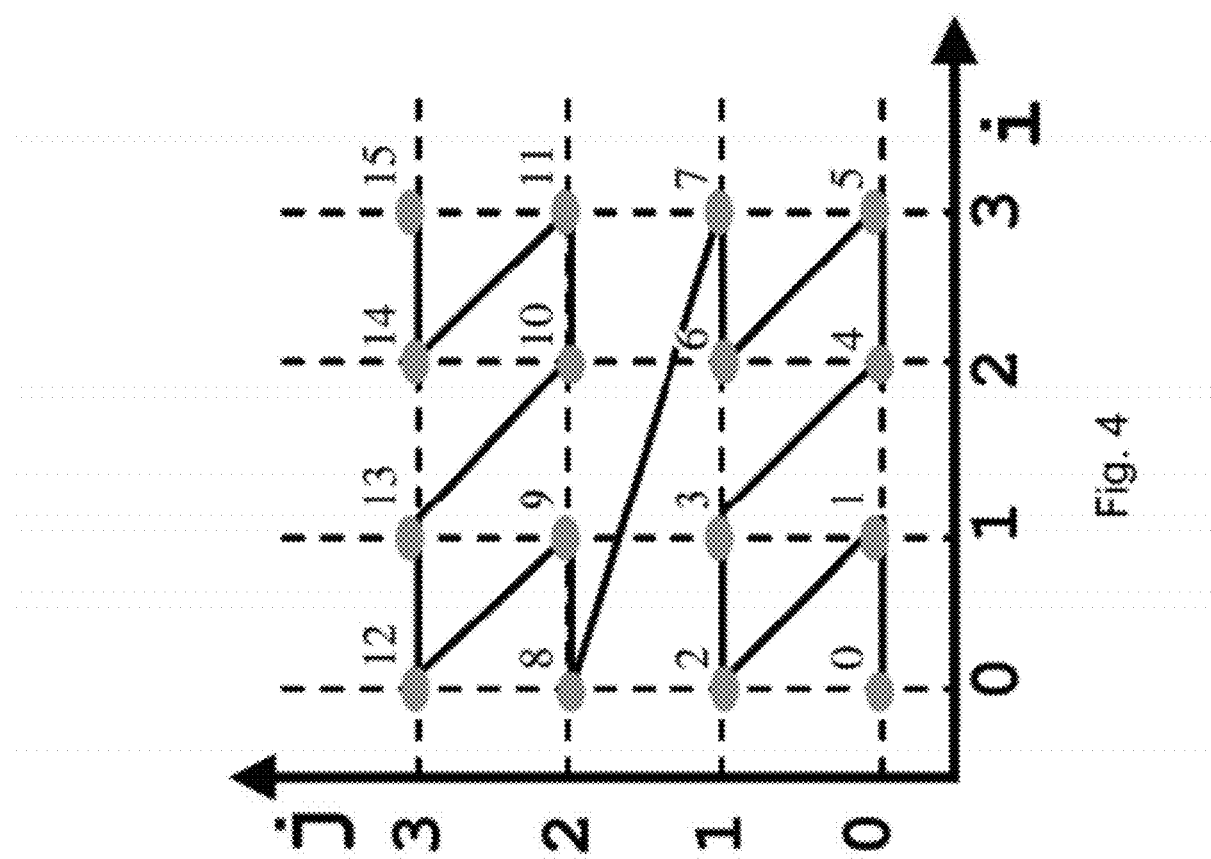
FIG. 4 depicts a graph of a z-order space filling curve overlaid on a two-dimensional array of data in row-major order.
Figure 5:
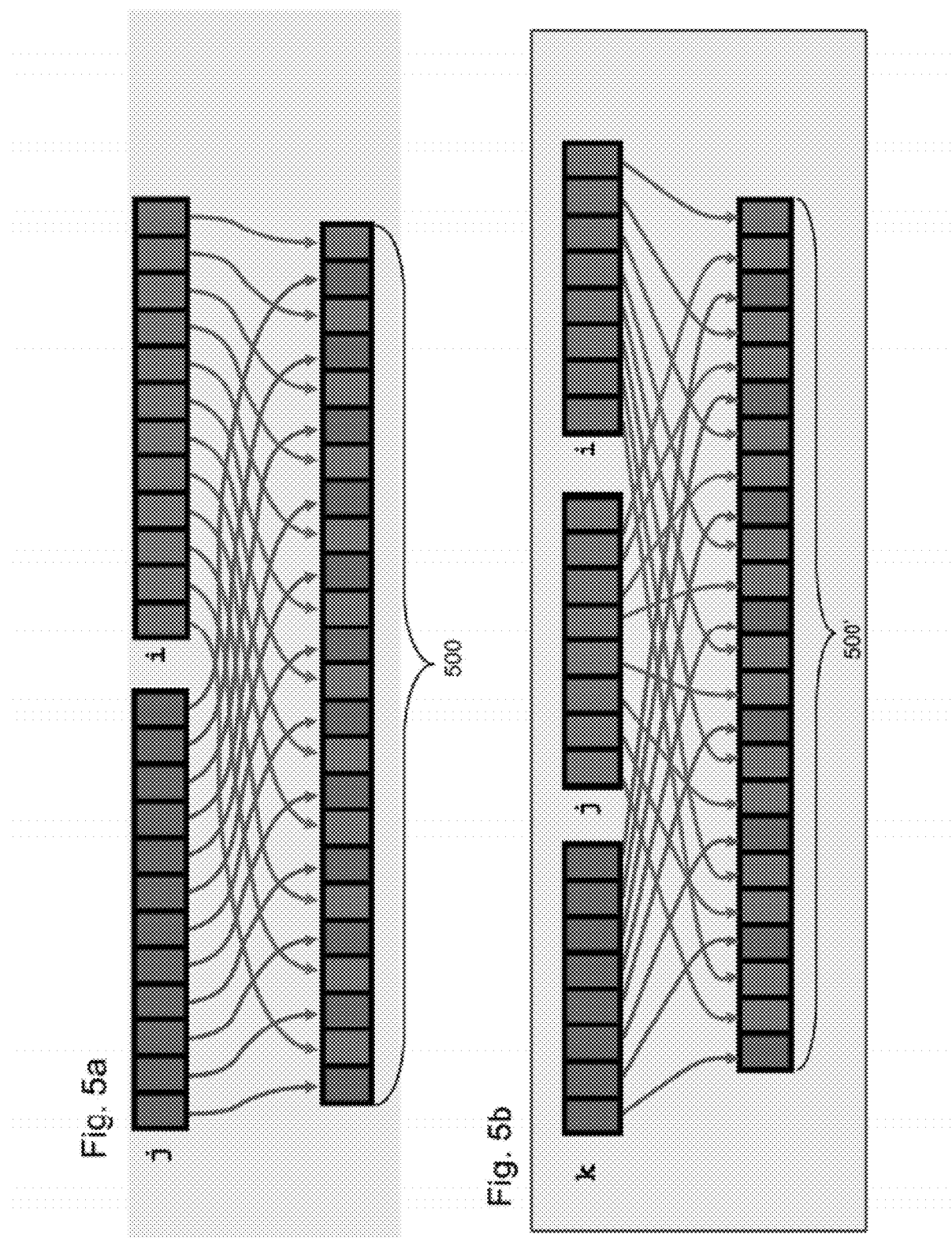
FIG. 5a depicts a graph of an address transformation from a two-dimensional (2D) row-major index (i, j) to z-order index I.
FIG. 5b depicts a graph of an address transformation from a 3D row-major index (i, j, k) to z-order index I.

In an operation 204, z-ordered data is defined from the array of data. With reference to FIG. 4, an example of z-ordered data (0, 1, 2, 3, . . . , 15) is shown for a 4×4 array of data arranged in row-major order (i, j). In the two-dimensional case, the z-order curve can be defined recursively by a "z" shape whose vertices are replaced by "z" shapes half its size. Given the binary row-major index of a pixel ($i_0 i_1 \ldots i_n$; $j_0 j_1 \ldots j_n$), the corresponding z-order index I is computed by interleaving the indices $I=j_0 i_0 j_1 i_1 \ldots j_n i_n$ as shown in FIG. 5a resulting in the table as shown in FIG. 6. FIG. 5b shows the same process for a 3D array stored in row-major order (i, j, k).

With continuing reference to FIG. 2, in an operation 206, a hierarchical z-order (HZ-order) is determined as shown in FIG. 7 based on the z-order index. As shown in FIG. 8a, to start the process, a first bit 802 is set to one and is added to the left of the given z-order index I 800 forming a second z-order index I 801, and an exit bit 804 is set to zero. With reference to FIG. 8b, the HZ-order is computed by shifting second z-order index I 801 to the right until the first one-bit exits in exit bit 804. As shown in FIG. 8b, the z-order index I 801 is shifted to the right and first bit 802 is set to zero in all subsequent shifts until exit bit 804 is one. The resulting index $I^h$ 806 comprised of the right most bits is the HZ-order.

As an example conversion from the z-order index to the HZ-order index, assume the given z-order index is 0010110100. The conversion results in the hierarchical z-order index of 0010010110 based on the following steps:

| Initial bit | Index bits | Exit bit |
|---|---|---|
| 1 | 0010110100 |   |
| 0 | 1001011010 | 0 |
| 0 | 0100101101 | 0 |
| 0 | 0010010110 | 1 |

As indicated in the far right column of FIG. 7 labeled "Level of resolution", the HZ-order provides an index that supports hierarchical access to the data at different resolution levels. The starting HZ-order index for each resolution level can be directly computed. For example, in a squared array, level 0 contains one sample and all other levels h contain $2^{h-1}$ samples. Therefore, the starting HZ-order index of level h, $I_{start}^h$, is $2^{m-h}$ where m is the number of bits of the largest HZ-order index. Within each level, samples are ordered according to plain z-order and can be traversed using a stack algorithm described below using the appropriate sub-sampling rate. Thus, iteration of the array in HZ-order can be accomplished by processing one resolution level at a time until the appropriate level of resolution is obtained based on the current processing of the image data.

To provide efficient access to any sub-region of the data without internal caching and without opening a data block more than once, the data can be stored based on blocks of data organized in the HZ-order. With continuing reference to FIG. 2, in an operation 208, an indication of a block size, a record size, and a group size is received. For example, the block size, the record size, and the group size may be set to default values in computer readable medium 108, received as an input from a user of data processing application 114, calculated based on an array size, etc.

Figure 9A:
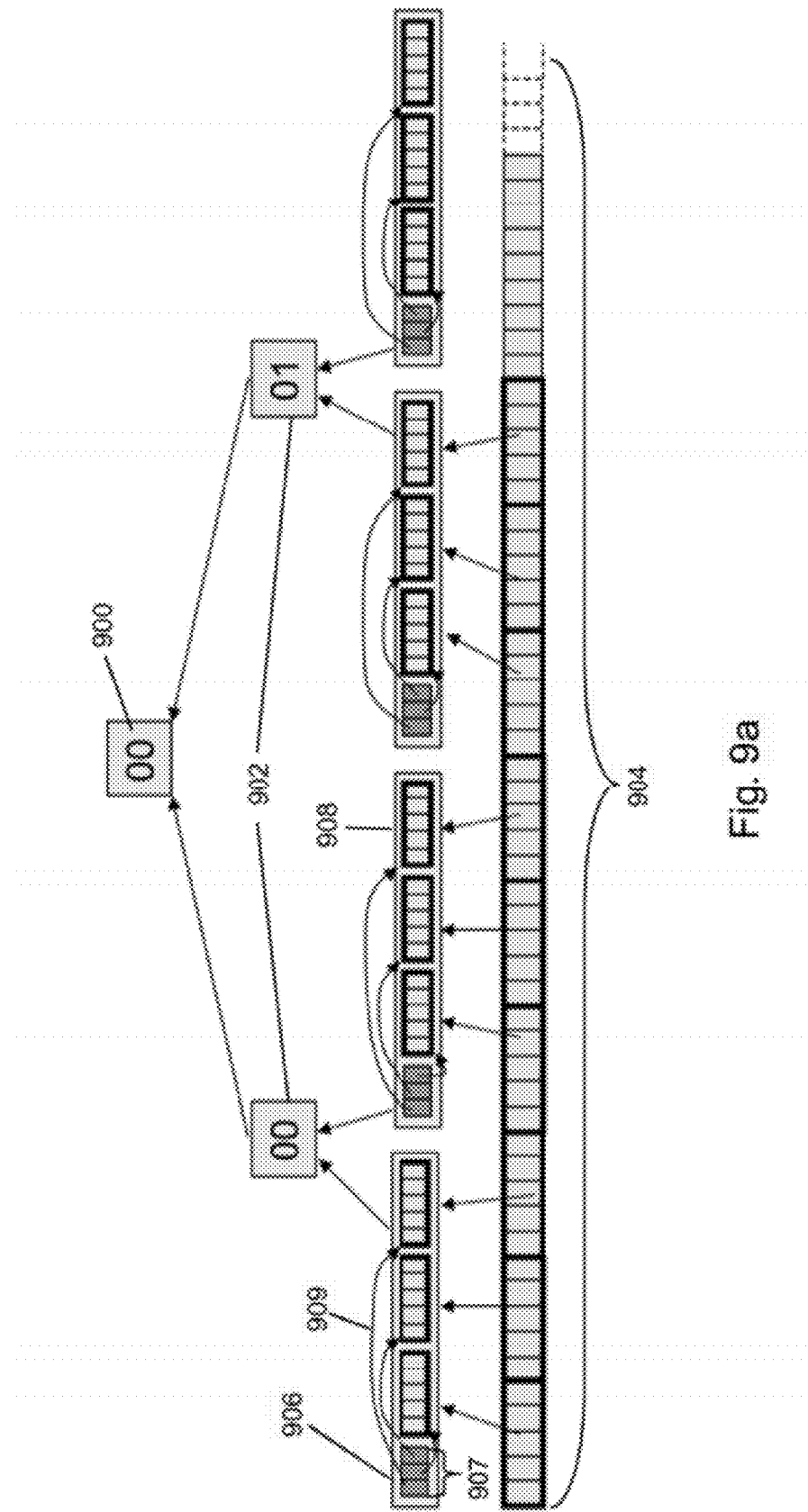
FIG. 9a depicts a file storage format for images of fixed resolution and for data sorted in hierarchical z-order in accordance with an example embodiment.
Figure 9B:
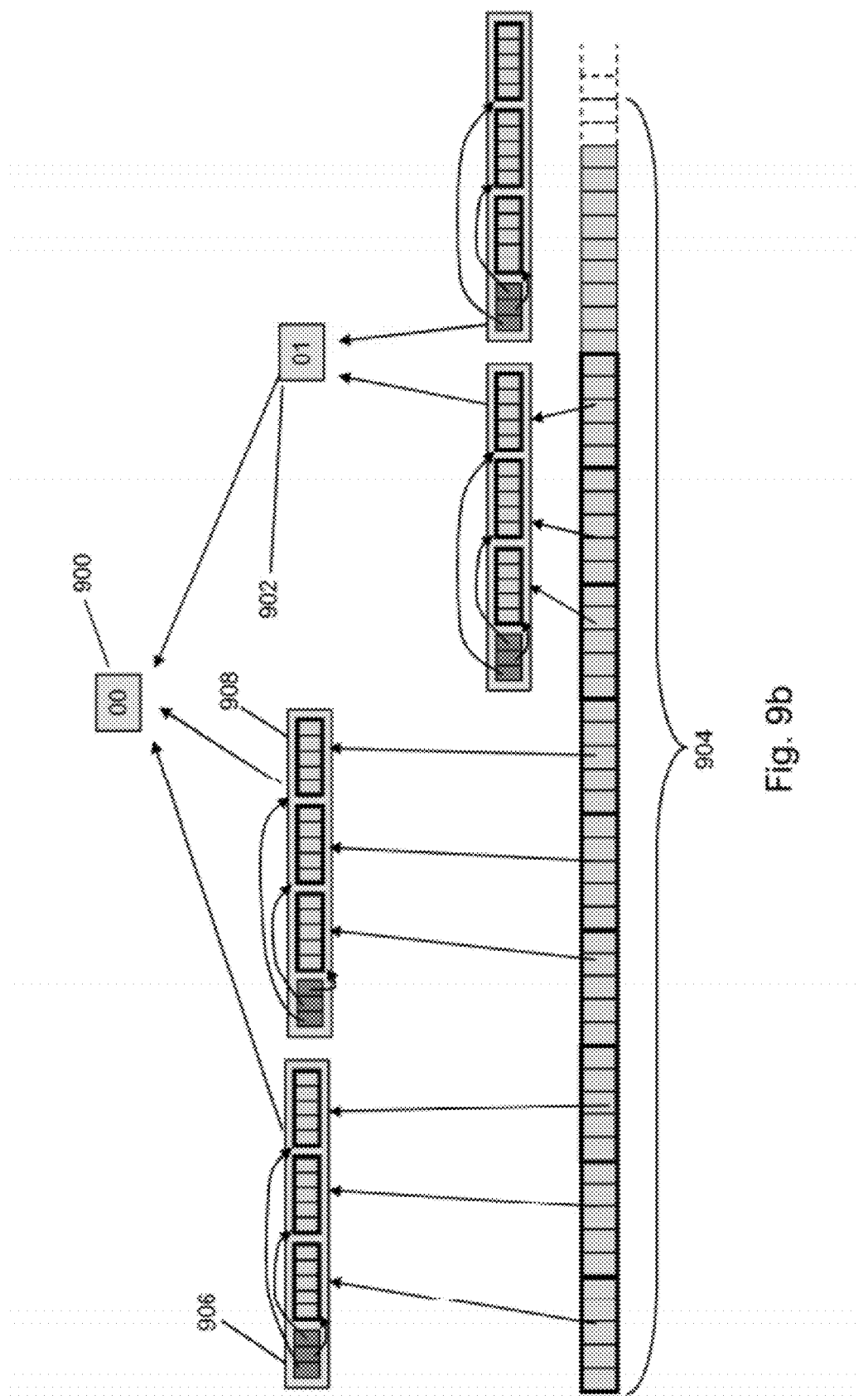
FIG. 9b depicts a file storage format for images of variable adaptive resolution and for data sorted in hierarchical z-order in accordance with an example embodiment.
Figure 9C:
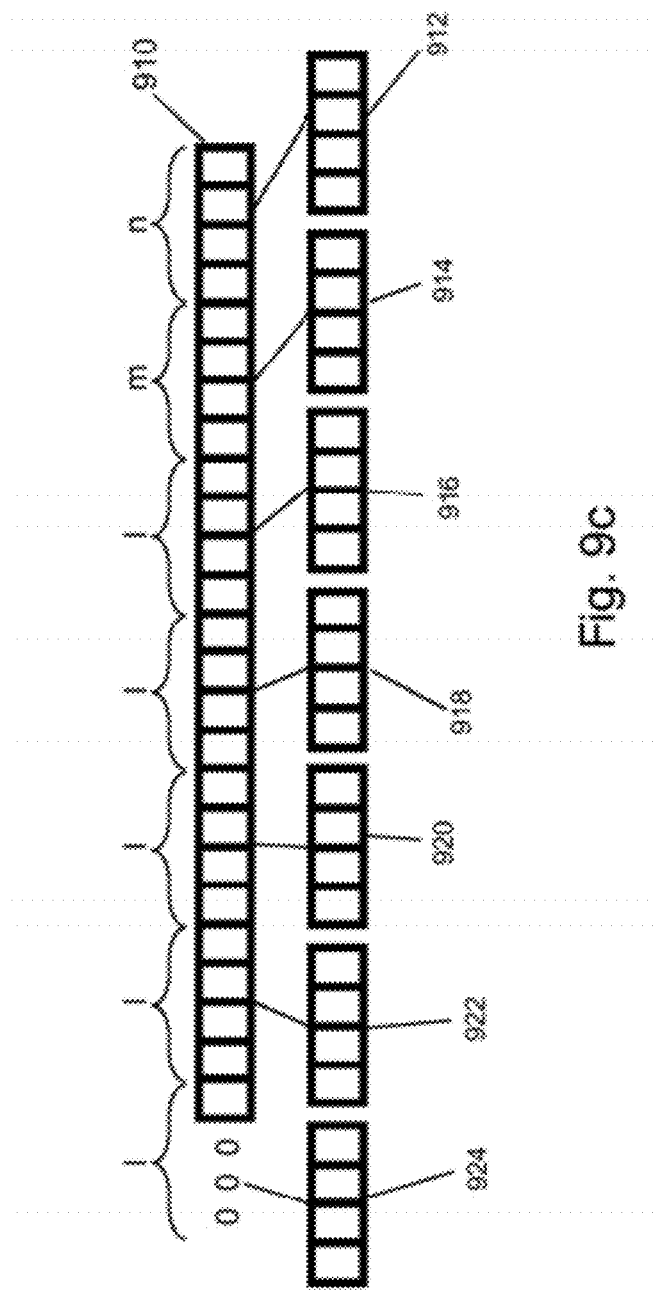
FIG. 9c depicts a sample of address computation for the file storage format in accordance with an example embodiment.

In an operation 210, a directory structure is created. For example, with reference to FIG. 9a, two levels of directories are created to store the data files, a first directory level 900 and a second directory level 902. Second directory level 902 is formed of subdirectories of first directory level 900. FIG. 9a illustrates a storage model for images of predetermined maximum resolution. With reference to FIG. 9b, a storage model for images of a variable adaptive maximum resolution is shown with the same data stored in a more flexible structure where prefix subdirectories composed of all zeroes are eliminated from the address computation shown in FIG. 9c so that all their content is moved to higher levels in the directory structure With continuing reference to FIG. 2, in an operation 212, data blocks of the indicated block size are created from the received image data in HZ-order. For example, with reference to FIG. 9, data blocks 904 having a block size of five are created from consecutive samples of the data reordered in HZ-order.

With continuing reference to FIG. 2, in an operation 214, data files are created from a sequence of data blocks based on the indicated record size. For example, with reference to FIG. 9a, a first data file 906 with a record size of three includes three successive data blocks, a second data file 908 includes the next three successive data blocks and based on a defined group size of two, the data files are clustered in groups of two in a subdirectory. Thus, a sequence of consecutive blocks is grouped into a record and records are clustered in groups, which are organized hierarchically within the created directory structure. Consider, for example, the case of FIG. 9c where each directory contains $2^l$ files or subdirectories, each file contains $2^m$ blocks, each block contains $2^n$ samples. Using the storage structure illustrated in FIG. 9a, an index $I^h$ 910 (shown with reference to FIG. 9c) defines a position for a data sample in a block given by the last n bits 912 of index $I^h$ 910, within a file at a block index given by the next m bits 914 of index $I^h$ 910, within the file given by the next l bits 916 of index $I^h$ 910 within a hierarchy of subdirectories for which each index is given by the next l bits 918, 920, 922, 924 of index $I^h$ 910. Consequently, the total number of directories, files, and blocks depend on the values of the parameters l, m, and n. Using the storage structure illustrated in FIG. 9b, the position of the same sample index $I^h$ 910 is computed in the same way after removing all of the leading zeroes 924 on the left of index $I^h$ 910. This makes the storage position of the lower resolution samples independent of the total number of bits in $I^h$ and allows adding new samples of arbitrarily finer resolution.

In an operation 216, header information is defined that describes the various parameters such as the dimension of the received image data, the block size, the record size, the group size, etc. For example, with continuing reference to FIG. 9a, a header 907 includes header information. Each record may have header 907 that specifies which of its blocks are actually present, and if the data is stored in a raw format or a compressed format, etc., and if the data is stored in a compressed format, an indicator of the compression format. In a first example implementation, a single file having a header describing the parameters of the format, i.e., interleaving sequence, block size, record size, etc., followed by the binary representation of the blocks. In a second example implementation, the header information may be stored in a special header file and each record in a separate file without a header.

With continuing reference to FIG. 9a, a pointer 909 in header 907 points to the position of the block within a record. This accommodates blocks of variable size (e.g. for compression), blocks out of order (e.g. following creation order), and avoids wasting space when blocks are missing. Optionally, a bit per sample can be used to specify if each sample is part of the input image or not which accommodates images of arbitrary size and samples that can be part of only part of a block. The sizes of blocks, records, and groups can be adjusted to better optimize the performance of the memory structure where the image is stored. For example, on a file system each directory can store efficiently a group of 256 files and/or subdirectories, a file can contain 128 blocks, and each block can contain 4096 data samples. In general, it is better if the sizes are powers of two because this simplifies some of the index computations.

In an operation 218, the created data files are stored in the created directory structure. Storage of the image data in the created data files may be considered storing in an out-of-core memory. Incomplete arrays and arrays of arbitrary size can be stored. The use of a file system to store and access the hierarchy using directories is not intended to be limiting and can be implemented with search trees or hash tables or other hierarchical reference mechanisms and stored in single databases or across multiple files or by accessing each record or group in different storage locations distributed over the Internet or other heterogeneous storage infrastructures.

Thus, the hierarchy of groups may be implemented as a hierarchy of directories each containing a predetermined maximum number of subdirectories and possibly records. The leaves of each directory contain only records. To open a file, the path to the file is reconstructed, and the file system is used to locate the file directly. In particular, the path to a record can be constructed by taking the HZ-order address of the first sample in the record, representing the address as a string, and partitioning the string into groups of characters naming directories, subdirectories, and the record file. Because blocks, records, and/or groups can be missing, the arrays of data need not cover the entire index space. In fact, received image data can easily be stored with different regions sampled at different resolutions. With the storage structure shown in FIG. 9b, the resolution can be increased after the initial image creation.

Figure 10:
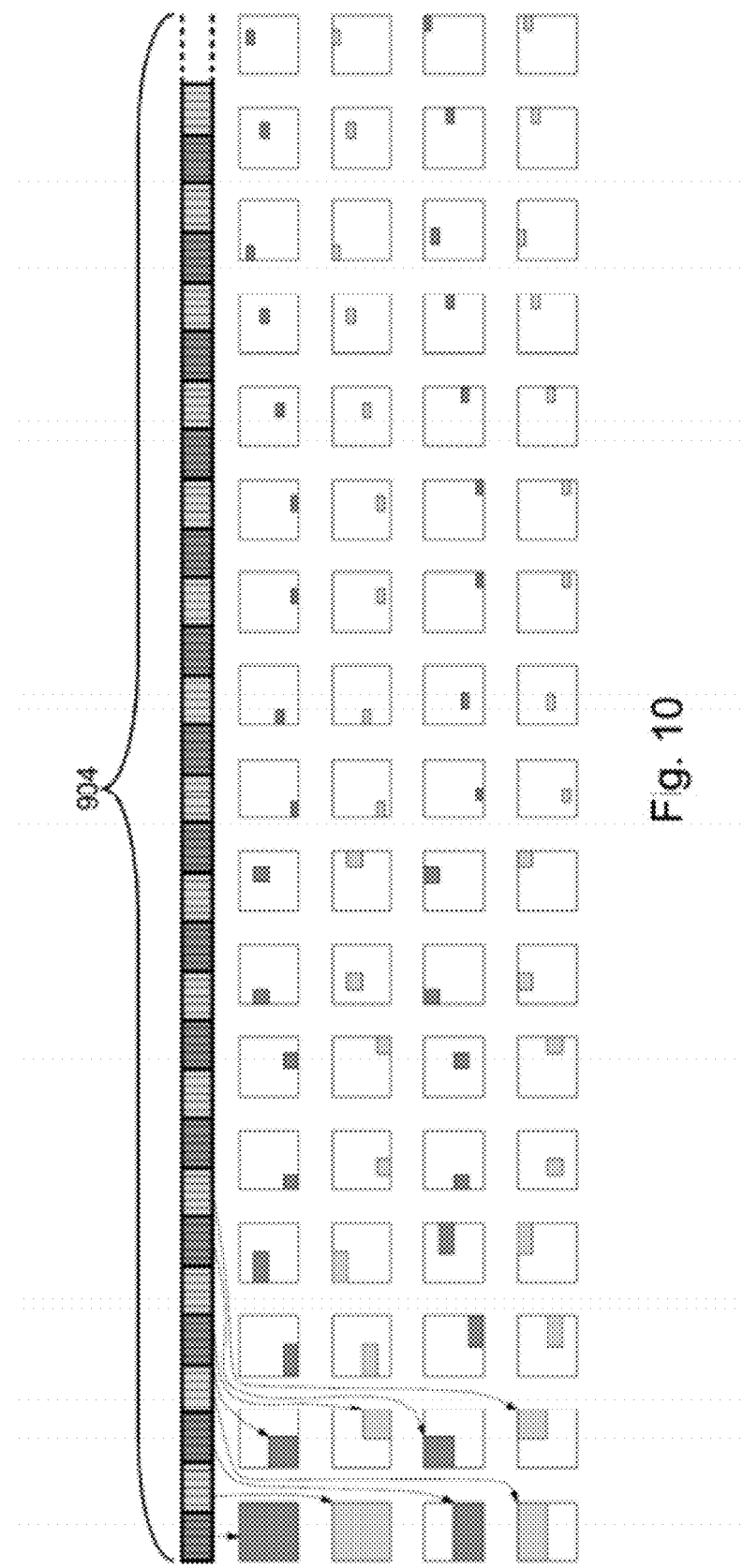
FIG. 10 depicts a data layout obtained for a two-dimensional matrix reorganized in hierarchical z-order in accordance with an example embodiment.
Figure 11A:
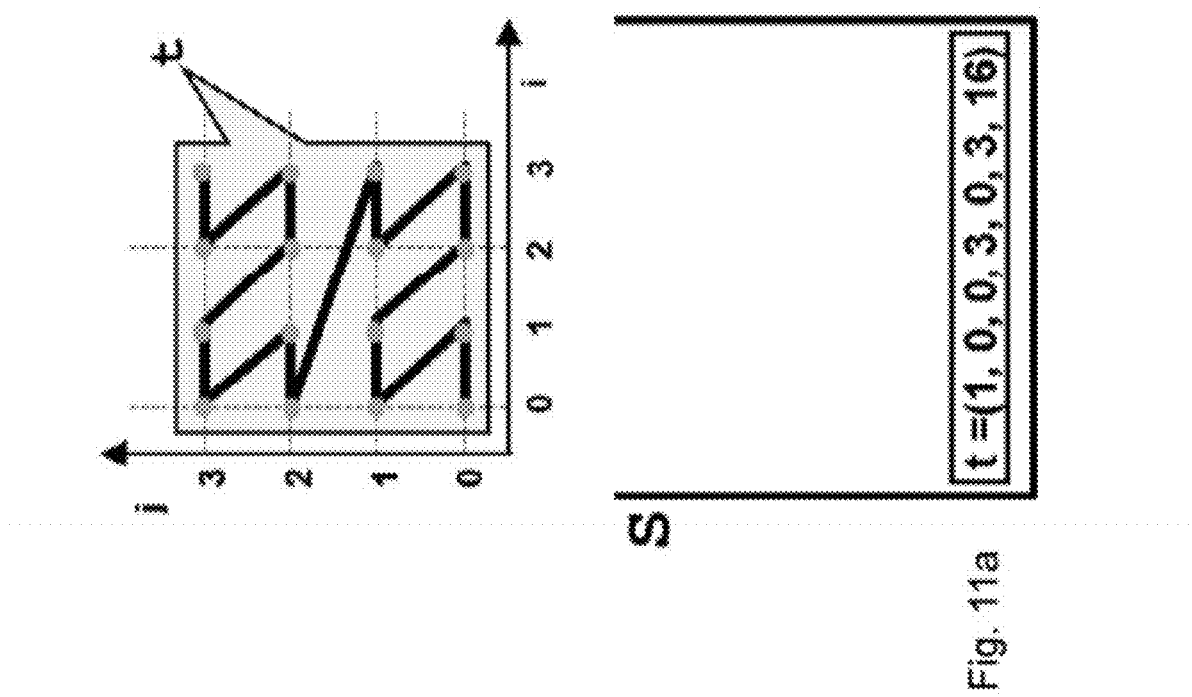
Figure 11B:
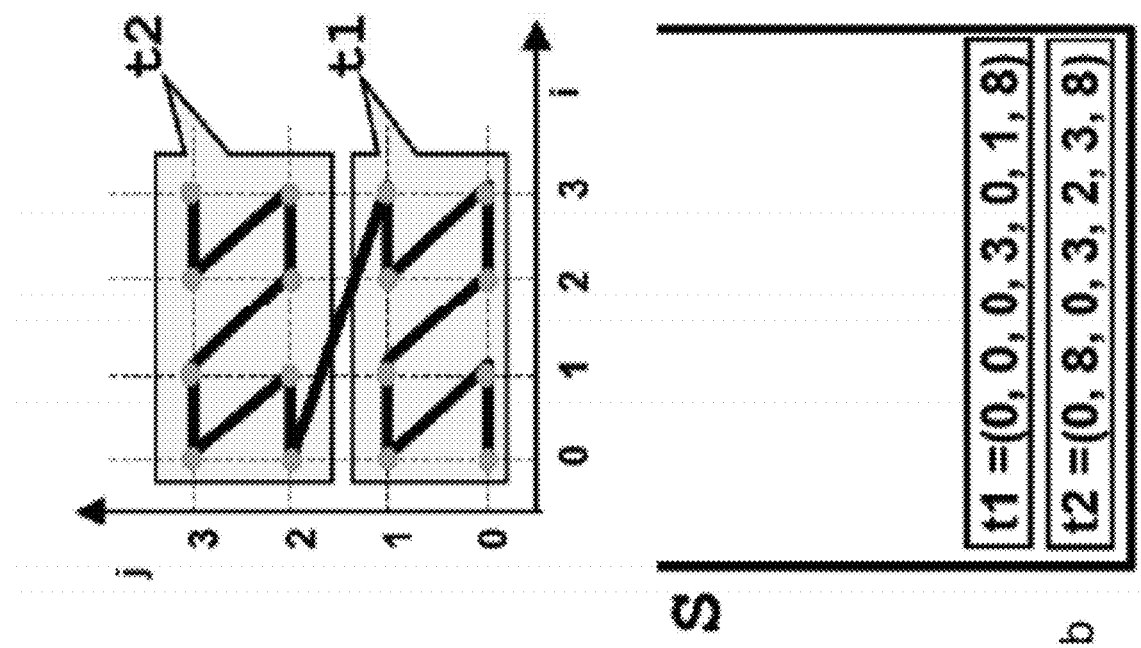
Figure 11C:
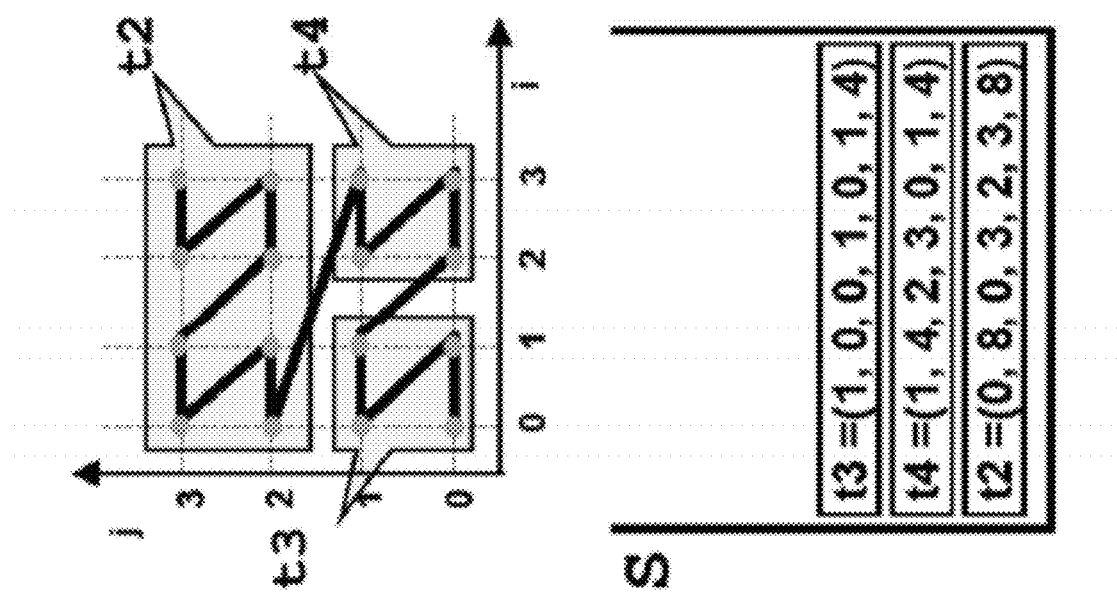
Figure 11D:
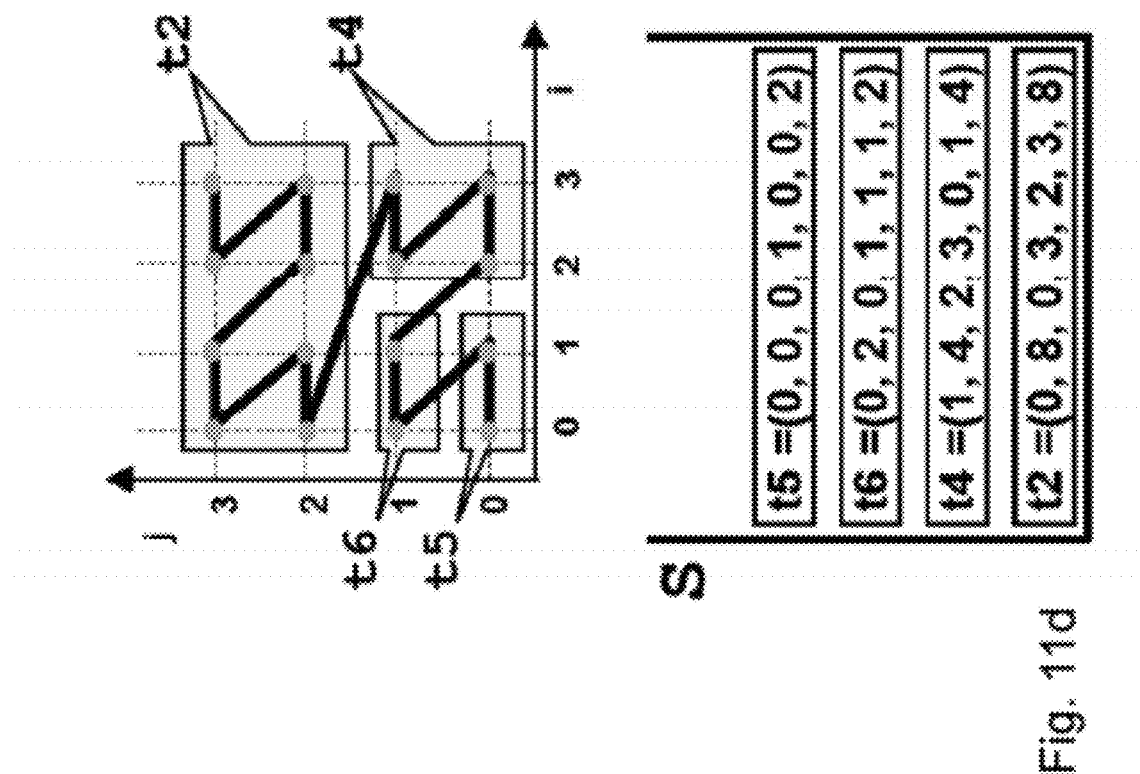
Figure 11E:
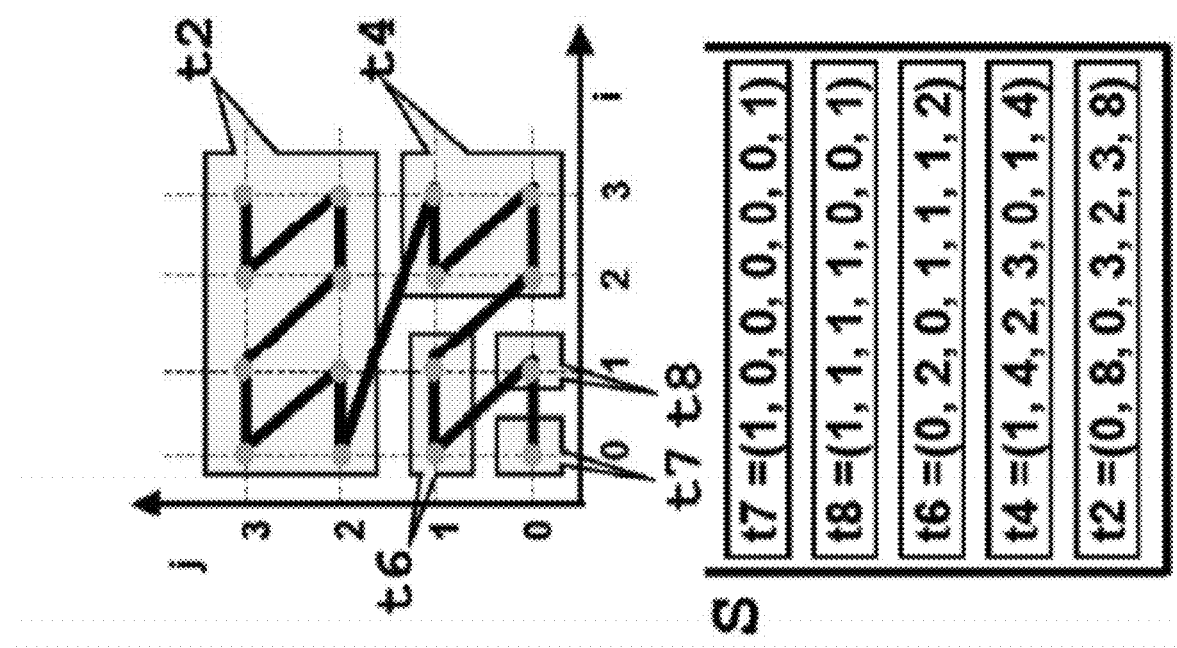
Figure 11G:
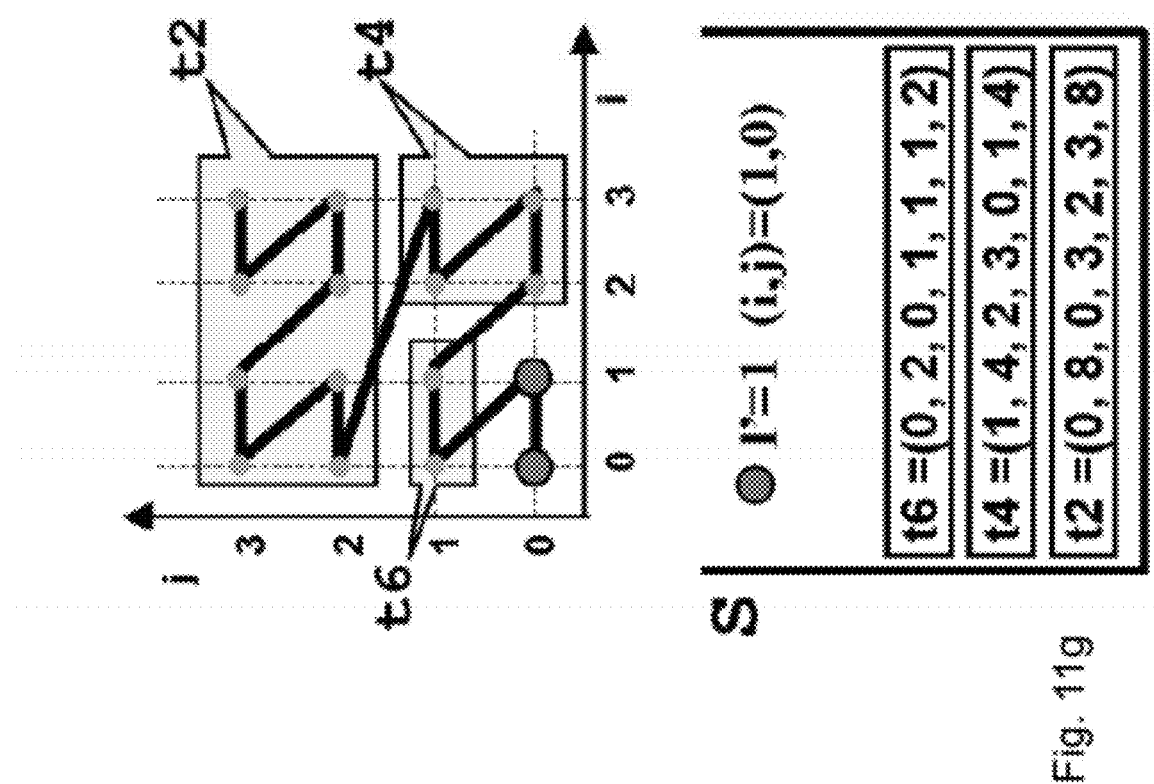
Figure 11H:
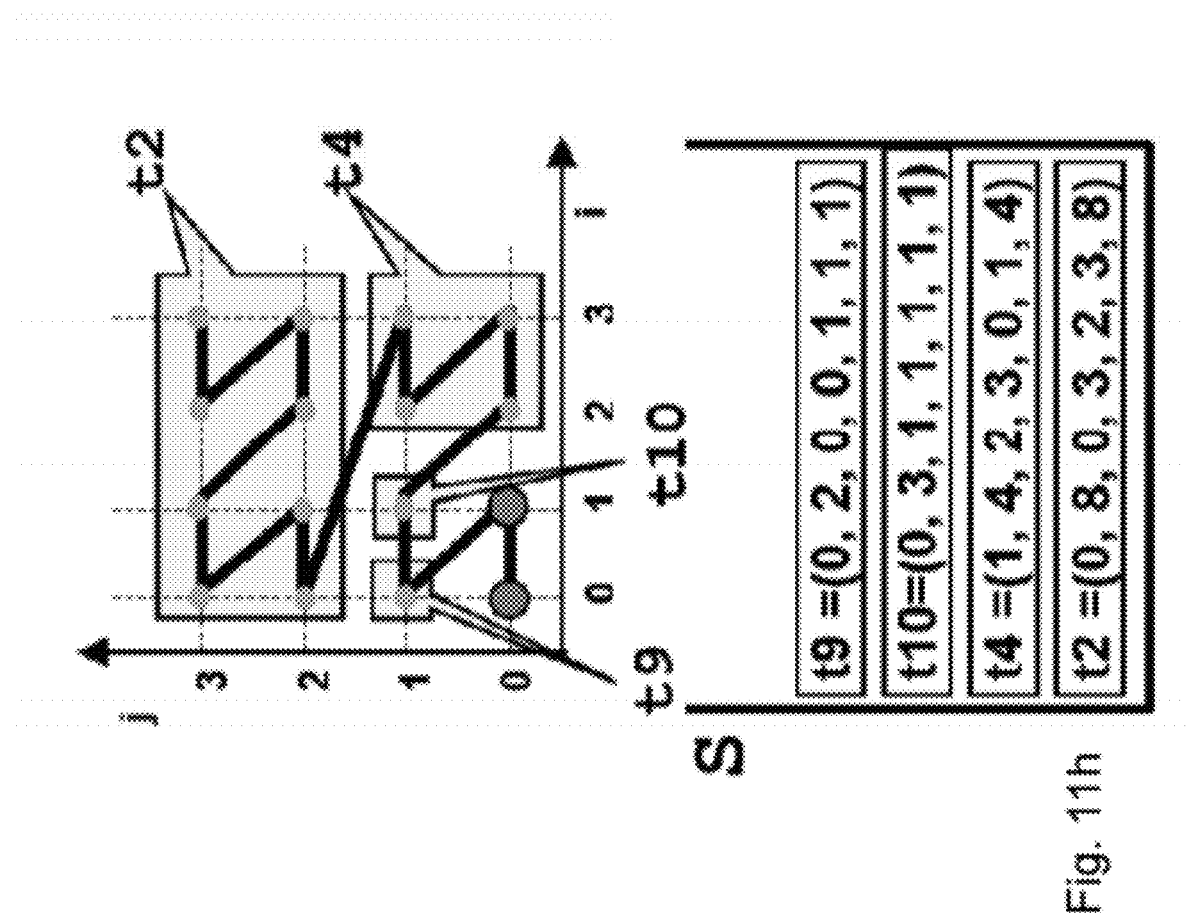
Figure 11I:
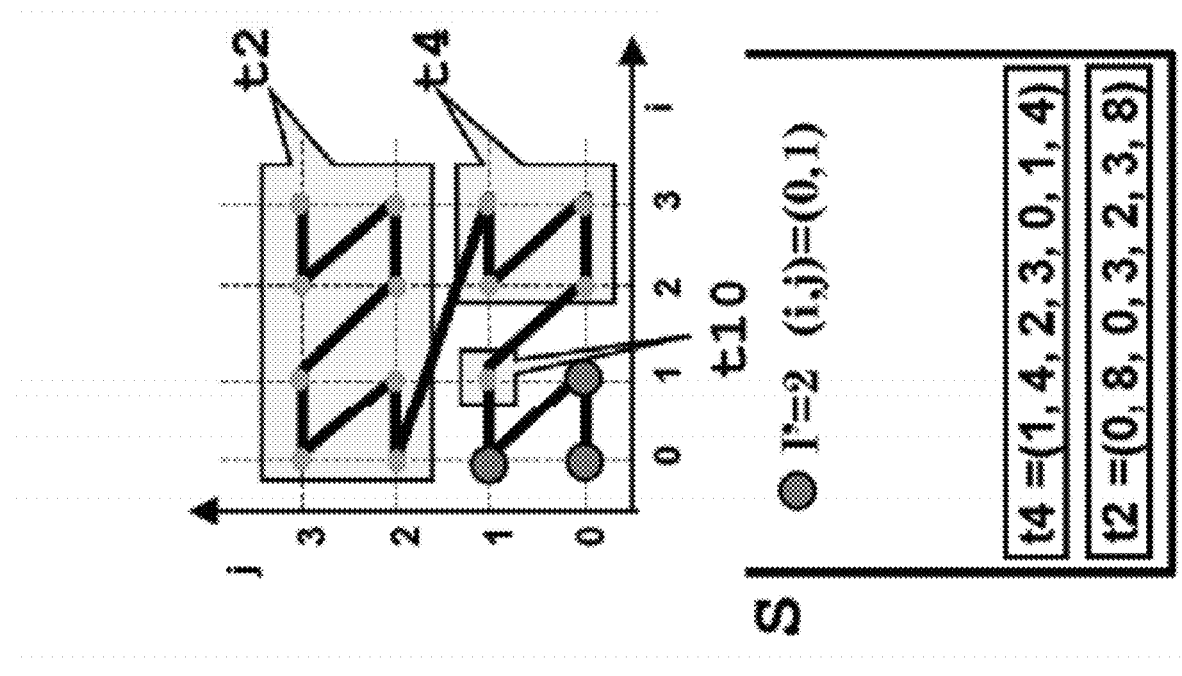
Figure 11J:
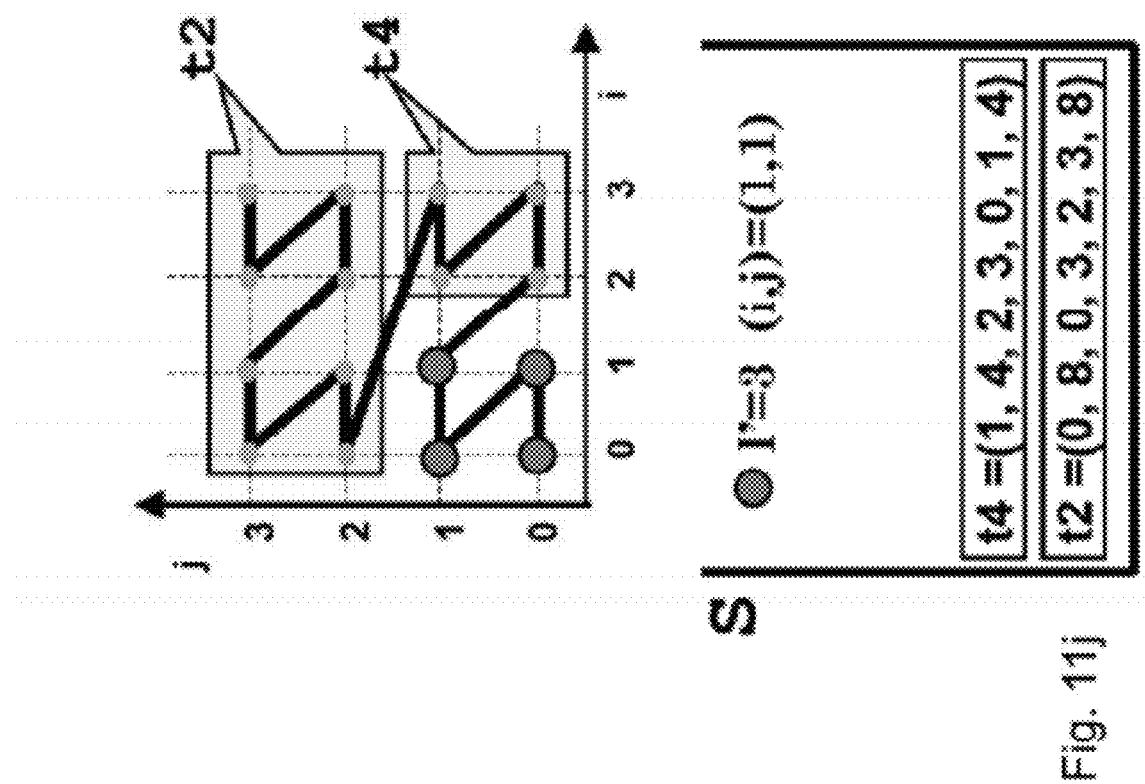

With reference to FIG. 10, a data layout of the data blocks 904 obtained for a two dimensional (2D) matrix reorganized using the HZ-order index is shown. Each gray region shows where the block of data is distributed in the 2D array. In particular, the first block is the set of lowest resolution data distributed uniformly on the 2D array. The next block is the next level of resolution still covering the entire matrix. The next two levels are finer data covering each half of the array. The subsequent blocks represent ever finer resolution data distributed with increasing locality in the 2D array.

Figure 3:
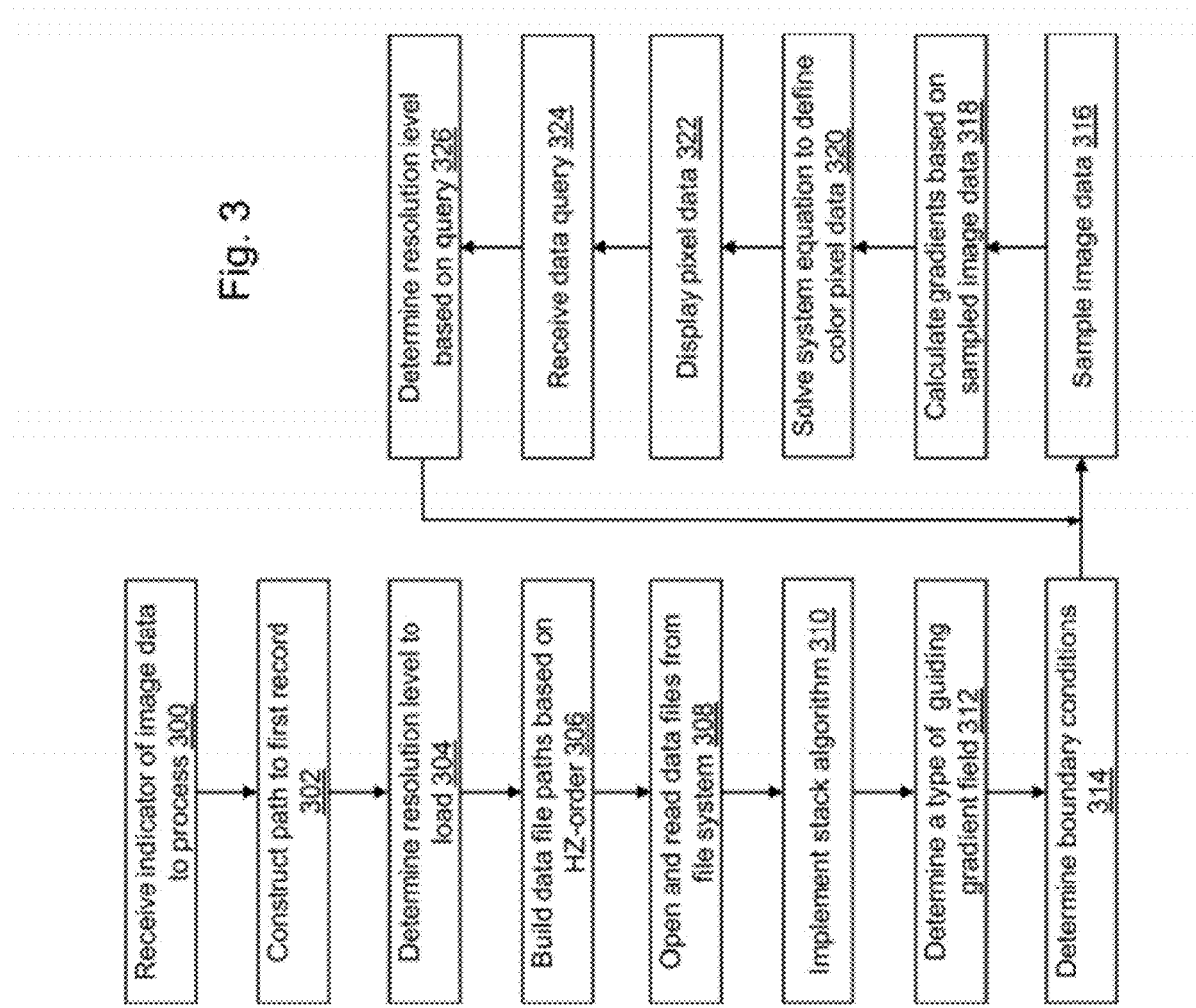
FIG. 3 depicts a second flow diagram illustrating second example operations performed by the data processing system of FIG. 1 in accordance with an example embodiment.

With reference to FIG. 3, second example operations associated with data processing application 114 of FIG. 1 are described. Additional, fewer, or different operations may be performed, depending on the embodiment. The order of presentation of the operations of FIG. 3 is not intended to be limiting. Thus, although some of the operational flows are presented in sequence, the various operations may be performed in various repetitions, concurrently, and/or in other orders than those that are illustrated. In an operation 300, an indicator of image data to process is received. For example, a user of data processing application 114 may select a data file to process using input interface 106. In general, the processing described with reference to FIG. 2 may have been performed previously so that the directory structure and hierarchical z-ordered data blocks have been created for the image data selected for processing. In an operation 302, a path is constructed to the first record of the indicated image data. For example, as discussed above, the path to the file is reconstructed by taking the HZ-order address of the first sample in the record, representing the address as a string, and partitioning the string into groups of characters naming directories, subdirectories, and the record file.

In an operation 304, a resolution level to load is determined based on a function associated with the processing of the image data. For example, the resolution level may be set as a default based on a default zoom level of an image and a display resolution. In an operation 306, a data file path to each file is determined based on the selected resolution level and the HZ-order. In an operation 308, the files are opened and image data is read onto a stack if sufficient in-core memory is accessible by processor 112. If sufficient in-core memory is not available, the image data is read as needed to process the image for display.

In reading the image data, in an operation 310, a stack algorithm may be implemented. A stack is an ordered list of items organized in a data structure based on the principle of last in, first out. Items are removed from the list (stack) in a reverse order to the order of their addition. Any abstract data type can be an item or element of the stack. There are two main operations: push and pop. The "push" operation adds (stores) items to the list (stack). The "pop" operation removes (deletes) an item from the list (stack), and returns or exports a value for the item to the calling application.

Figure 12:
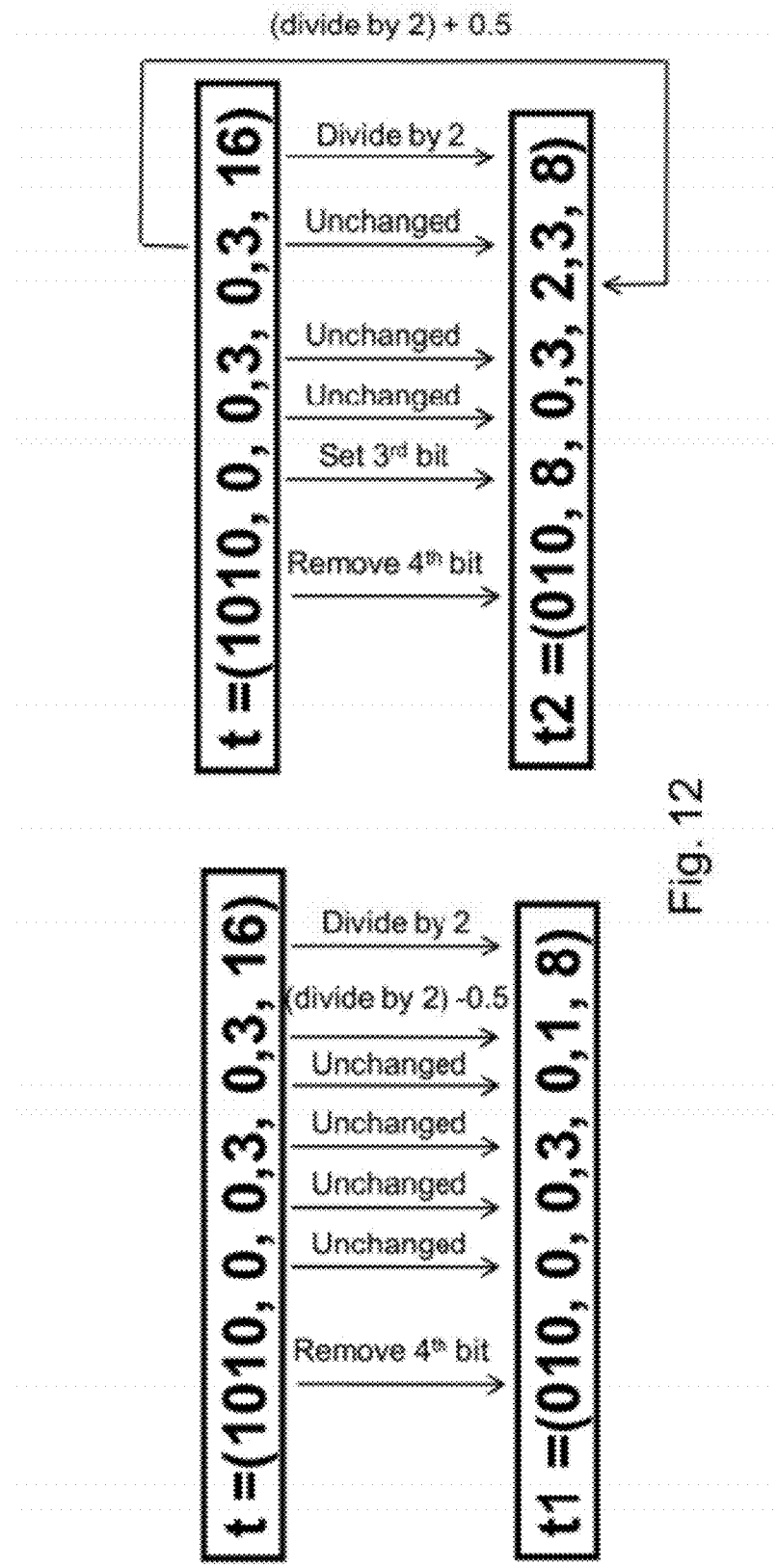
FIG. 12 depicts a process for obtaining a transformation of a parameter list by manipulating bits in accordance with an example embodiment.

With reference to FIGS. 11a-11j, a stack algorithm supporting fast index computation and data queries is described. The stack contains tuples or parameter lists including (split_dimension, I_start, min_i, max_i, min_j, max_j, num_elements). To start the process, with reference to FIG. 11a, the tuple $t_0=(1,0,0,3,0,3,16)$ is pushed onto the stack where in this example split_dimension=1, I_start=0, min_i=0, max_i=3, min_j=0, max_j=3, num_elements=16 as shown for the case illustrated in FIG. 4. At each iteration, the top-most element t is popped from the stack. If t contains only a single element, the current I_start is output as the HZ-order index and the corresponding sample is fetched from the file structure. Otherwise, as shown with reference to FIG. 11b, the region represented by t is split into two pieces along the axis given by split_dimension, and the corresponding tuples are created such as $t_1=(0,0,0,3,0,1,8)$ and $t_2=(0,8,0,3,2,3,8)$. For example, the tuple parameter num_elements is divided by two because the region is divided in two and the tuple parameters min_i, max_i, min_j, and max_j are changed to indicate the appropriate boundaries for the two new regions. The elements of $t_1$ and $t_2$ can be computed from t by simple bit manipulation of each element of the tuple as shown in FIG. 12. In the case of a square array, the split dimension is flipped each time a tuple is split. However, a specific split order can also be stored to accommodate rectangular arrays. FIGS. 11c-11j show the first eight iterations of the stack algorithm outputting the first four elements in the array of FIG. 4.

To use this algorithm for fast range queries, each tuple is tested against a query box (or an arbitrarily shaped query region) as it comes off the stack and discarded if no overlap exists between the tuple and the query box. Since the row-major indices describing the bounding box of each tuple are computed concurrently (min_i, max_i, min_j, max_j), the intersection test is straightforward for a box. It is also simple to estimate conservatively for an arbitrary query region. Furthermore, the method applies virtually unchanged to traverse samples in z-order that sub-sample an array uniformly along each axis, where the sub-sampling rate along each axis could be different. Based on this, the array can be traversed in hierarchical z-order by processing one level at a time, adding $I_{start}^h$ to the I_start of each tuple.

In practice, the stack tuples may not be subdivided to the level of a single sample. Instead, depending on the platform, a parameter n may be selected and a table built with the sequence of z-order indices for an array with $2^n$ elements. When executing the stack algorithm, each time a tuple t with $2^n$ elements appears, the table is looped through instead of splitting t. By accessing only the necessary samples in strict HZ-order, the stack-based algorithm guarantees that only the minimal number of disk blocks are touched and each block is loaded just once.

For progressively refined zooms in a given area, the algorithm can be applied with a minor variation. In particular, the size of the bounding box represented in a tuple can be reduced each time the tuple is pushed back onto the stack. In this way, even for a progressively refined zoom, only the needed data blocks are accessed, and the data blocks are only accessed once.

In another illustrative embodiment, other hierarchical data access methods may be used. For example, a tiled hierarchy may be used to produce an anti-aliased image, though high contrast areas in the original image may be lost in the smoothing. The visual smoothness may also need significant preprocessing, provide reduced flexibility when data is missing, and result in an increased number of input/output operations when traversing the data.

In an operation 312, a type of guiding gradient field is determined. For example, the type of guiding gradient filed may be selected based on a type of image processing to be performed. As understood by a person of skill in the art, gradient-based methods provide a set of techniques for advanced image manipulation based on the value of a gradient field rather than based directly on the pixel values. Using these techniques, a guiding gradient field constructed from one or multiple source data images attempts to find a closest-fit image using a predetermined distance metric. Gradient-based methods have been adapted for standard image editing, advanced matting operations, high level drag-and-drop functionality, tone mapping high dynamic range (HDR) images to display favorably on display 104, seam hiding in a panorama, light detection, shape detection, shadow or reflection removal, gradient domain painting, etc.

In an operation 314, boundary conditions are determined. As understood by a person of skill in the art, boundary conditions act as constraints in solving a system equation. In the case of seamless cloning, Dirichlet boundary conditions set to be the color values of the background image at the boundaries may be determined to be the boundary conditions, and a source image gradient may be determined to be the type of guiding gradient field. For tone mapping and image stitching, Neumann boundary conditions may be determined to be the boundary conditions, and the composited gradient field of the original image may be determined to be the type of guiding gradient field. The unwanted gradient between images may be considered to be zero, and the gradient may be averaged across the stitch. The guiding gradient for tone mapping may be adjusted from the original pixel values to compress the HDR imaging range. For image processing techniques such as gradient domain painting, the type of guiding gradient field may be user-defined.

In an illustrative embodiment, a user of data processing application 114 may select, using input interface 106, a type of guiding gradient field, a distance metric, and/or boundary conditions to utilize in processing the image data for display using display 104. As another example, a user of data processing application 114 may select, using input interface 106, a type of image processing to perform and data processing application 114 may automatically select the type of guiding gradient field and/or boundary conditions to utilize in processing the image data for display based on the image processing selection. As another example, data processing application 114 may be designed to use only one type of guiding gradient field and/or boundary conditions.

In an operation 316, image data is sampled based on the determined resolution level, for example, using the stack algorithm. The sampling is obtained by selection of one pixel of the original image data every K samples selected based on the determined resolution level to reduce the resolution to a level, for example, that can be used in in-core memory and that executes sufficiently fast. For example, one million pixels may be sampled out of an image that is hundreds of gigapixels or more.

In an operation 318, gradients are calculated for each pixel of the sampled image data using the determined type of guiding gradient field. In an operation 320, a system equation is solved to define color pixel data using the sampled image data and the calculated gradients. In an illustrative embodiment, the system equation defined in equation (4) below is solved based on the Poisson process as described in equations (2) and (3).

Given a gradient field $\vec{G}(x, y)$, defined over a domain $\Omega \subset \Re^2$, an image P(x, y) is sought such that its gradient $\nabla P$ fits $\vec{G}(x, y)$. In order to minimize $\|\nabla P - \vec{G}\|$ in a least squares sense, the following optimization problem is solved:

$$\min_p \iint_\Omega \|\nabla P - \vec{G}\|^2. \tag{2}$$

Minimizing equation (1) is equivalent to solving the Poisson equation $\Delta P = \text{div}\vec{G}(x, y)$, where $\Delta$ denotes the Laplace operator $$\Delta P = \frac{\partial^2 p}{\partial x^2} + \frac{\partial^2 p}{\partial y^2}$$

and $\text{div}\vec{G}(x, y)$ denotes the divergence of $\vec{G}$.

To adapt the equations shown above to discrete images, a standard finite difference approach approximating the Laplacian is applied as:

$$\Delta P(x,y) = P(x+1,y) + P(x-1,y) + P(x,y+1) + P(x,y-1) - 4P(x,y) \tag{2}$$

where P(x, y) is 2D image data for the point defined by indices x and y, and the divergence of $\vec{G}(x, y) = (G^x(x, y), G^y(x, y))$ is applied as:

$$\text{div}\vec{G}(x,y) = G^x(x,y) - G^x(x-1,y) + G^y(x,y) - G^y(x,y-1). \tag{3}$$

where $G^x(x, y)$ is an x gradient value in an x-dimension, and $G^y(x, y)$ is a y gradient value in a y-dimension for the point defined by indices x and y. The differential form $\Delta P = \text{div}\vec{G}(x, y)$ can therefore be discretized into the following sparse linear system:

$$Lp = b. \tag{4}$$

Each row of the matrix L stores the weights of the standard five-point Laplacian stencil defined by equation (2), p is the vector of pixel colors, and b encodes the guiding gradient field as well as the boundary conditions as understood by a person of skill in the art. For example, p may define a vector of red, green, blue (RGB) colors as understood by a person of skill in the art. The gradient at each pixel is estimated from the sampled image data determined in operation 316 and not from a coarsening of the finer resolution data. Though equations (2)-(4) are defined for 2D, the process works unchanged for higher dimensional data. In an operation 322, the pixel data p is displayed in display 104.

In an operation 324, a data query is received, for example, from a selection made by a user of data processing application 114 using input interface 106. As an example, the user may pan the image, zoom into a location on the image, zoom out of the image, or edit the displayed image. For example, in editing the image, the user may apply complex operators such as seamless cloning, panorama stitching, tone mapping, etc. The stack algorithm is used to provide a rapid response to the received data query.

Figure 13:
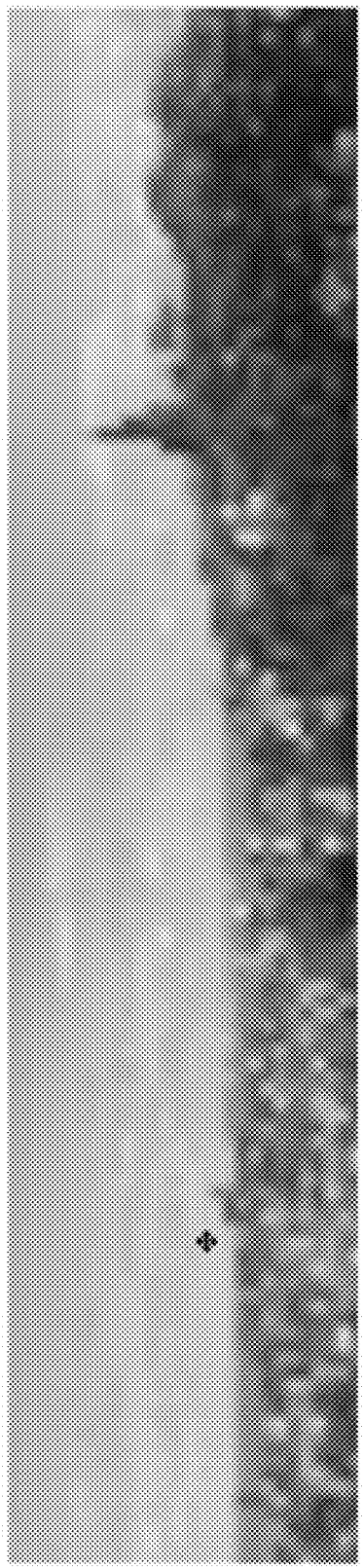
FIG. 13 depicts an image display at a first resolution level as a user pans the image in accordance with an example embodiment.
Figure 14:
FIG. 14 depicts the image display at a second resolution level higher than the first resolution level of FIG. 13 when the user stops panning the image in accordance with an example embodiment.

In an operation 326, the resolution level is determined based on the type of data query received. For example, the displayed resolution level may or may not change and may change to a higher or a lower resolution dependent on the actions performed by the user in interacting with the image displayed using data processing application 114. For example, with reference to FIG. 12, a lower resolution level or the same resolution level may be displayed as the user pans the image. When the user stops panning, a higher resolution image may be displayed as shown with reference to FIG. 13, based on the rapidly accessible hierarchical z-ordered data and recursive use of the stack algorithm.

After receiving the data query, processing continues at operation 316 where the image data is up-sampled, down-sampled, or new image data is loaded dependent on the data query. For example, given a user request to refine the displayed image in a particular region (a zoom in), the image data is up-sampled in operation 316 by adding new rows and/or new columns to the image data already read from the input image data in the previous execution of operations 316-322. Because the resolution increase may be directly coupled with the decrease in the extent of the local view, the number of pixels that are processed may remain constant resulting in a logarithmic run-time complexity and a constant memory storage requirement.

New gradient information is estimated using equation (3) and the up-sampled data in operation 318. Matrix L is updated with the up-sampled data using equation (2) and an initial estimate of p including the new image data points is defined by averaging the colors previously defined for the neighboring pixels of each new image data point. The Poisson process is solved in operation 320 with one or more iterations of an iterative solver (or by a direct solver) until it sufficiently approximates the solution of equation (4) and the solution is updated by displaying the newly defined pixel data in operation 322.

In an illustrative embodiment, the iterative solver is assumed to have converged when the $L_2$ norm of the residual between iterations is less than $1.0 \times 10^{-3}$ though other methods may be used to determine that a solution has been reached as known to a person of skill in the art. Thus, the solution (pixel data) computed at the previous level of resolution is refined by averaging the information and filling in the new rows. One or more iterations of the solver may be used to solve the linear system and update the solution based on the new gradient information. As a result, the gradients are estimated on the fly using only the available resolution data.

A user can pan in any direction by executing the up-sampling procedure only on newly visible rows and/or columns of image data and again solving the Poisson process solver with one or more iterations of equation (4).

In an illustrative embodiment, the initial execution of operations 316-322 uses a direct method based on cosine and fast Fourier transforms when image processing techniques such as stitching and HDR compression that use Neumann boundaries are selected. For methods that use Dirichlet boundaries, such as seamless cloning, an iterative method such as successive over-relaxation (SOR) may be used. In an illustrative embodiment, subsequent executions of operations 316-322 use an iterative method such as SOR or conjugate gradient though direct methods such as a fast Fourier transform method may be used.

Like other in-core methods, the progressive solver described may be limited by available in-core memory. To address this issue, the progressive solver may automatically switch modes to a moving-window, out-of-core progressive solver. For example, data processing application 114 may automatically switch to an out-of-core process if an amount of memory required to sample the image data exceeds a maximum memory limit. The maximum memory limit may be based on an in-core memory of computing device 102. The out-of-core progressive solver maintains strict control over memory usage by sweeping the data with a sliding window. A window defines a number of pixels in each dimension that is processed in-core in a single step. A size of the sliding window may be determined based on the maximum memory limit.

The window traverses the finest desired resolution, which may be several levels in the hierarchy from the currently available solution. If the jump in resolution is too high, the process can be repeated several times. The jump in resolution may be considered too high if the lower level of sampling does not contain a minimum number of pixels of the finest desired resolution and the interpolation of the lower resolution values is not effective. For example, depending on the size of the in-core memory, a jump in resolution of ten levels may be considered too high. Within each window, the lower resolution solution is up-sampled, and the new resolution image is solved using the gradients from the desired resolution. Since the window is defined at the desired resolution, there is no need to expand the memory beyond the size of the window. Furthermore, successive windows may be arranged such that they overlap with the previously solved data in both (multiple, if more than two) dimensions to produce a smooth solution. The overlap causes the solver to load and compute some of the data multiple times. This overlap has an inherent overhead when compared to an idealized in-core solver. For example, given a 1/x overlap, the four corners, each 1/x×1/x in size, are executed four times. The four strips on the edge of the window, not including the corners, each $$\frac{1}{x} \times \left(1 - \frac{2}{x}\right)$$

in size are executed twice. All other pixels, size $$\left(1-\frac{2}{x}\right) \times \left(1-\frac{2}{x}\right).$$

are executed once. Therefore, the overhead computation for this 1/x overlap is given by $$4 \Big/ x\left(1+\frac{1}{x}\right).$$

Moreover, the input/output overhead can be reduced to 1/x, because the pixel data is retained from the previous window in the primary traversal direction.

Using the described methods, data processing application 114 provides interactive editing of images that exceed hundreds of gigapixels in size.

The word "example" is used herein to mean serving as an example, instance, or illustration. Any aspect or design described herein as "example" is not necessarily to be construed as preferred or advantageous over other aspects or designs. Further, for the purposes of this disclosure and unless otherwise specified, "a" or "an" means "one or more". The example embodiments may be implemented as a method, apparatus, or article of manufacture using standard programming and/or engineering techniques to produce software, firmware, hardware, or any combination thereof to control a computer to implement the disclosed embodiments.

The foregoing description of example embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system comprising:
a processor; and
a computer-readable medium operably coupled to the processor, the computer-readable medium having instructions stored thereon that, when executed by the processor, cause the system to
sample image data at a first resolution, wherein the first resolution is lower than a full resolution of the image data;
calculate gradients for the sampled image data;
solve a system equation to define color pixel data for each pixel of the sampled image data using the sampled image data and the calculated gradients;
control a display of the color pixel data on a display;
receive a request to zoom into a location of the displayed color pixel data;
determine a second resolution of the image data based on the request;
sample the image data at the determined second resolution, wherein the determined second resolution is higher than the first resolution;
calculate updated gradients for the image data sampled at the determined second resolution;
solve the system equation for zoomed color pixel data for each pixel of the image data sampled at the determined second resolution using the image data sampled at the determined second resolution and the calculated updated gradients; and
control a second display of the zoomed color pixel data on the display.

2. The system of claim 1, wherein the computer-readable instructions further cause the system to receive a request to pan the displayed color pixel data in a first direction.

3. The system of claim 2, wherein the computer-readable instructions further cause the system to:
sample the image data to include second image data at the first resolution in the first direction;
calculate second updated gradients for the image data sampled to include the second image data;
solve the system equation for panned color pixel data for each pixel of the image data sampled to include the second image data using the image data sampled to include the second image data and the calculated second updated gradients; and
control a third display of the panned color pixel data on the display.

4. A computer-readable medium having stored thereon computer-readable instructions that, when executed by a computing device, cause the computing device to:
sample image data at a first resolution, wherein the first resolution is lower than a full resolution of the image data;
calculate gradients for the sampled image data;
solve a system equation to define color pixel data for each pixel of the sampled image data using the sampled image data and the calculated gradients;
control a display of the color pixel data on a display;
receive a request to zoom into a location of the displayed color pixel data;
determine a second resolution of the image data based on the request;
sample the image data at the determined second resolution, wherein the determined second resolution is higher than the first resolution;
calculate updated gradients for the image data sampled at the determined second resolution;
solve the system equation for zoomed color pixel data for each pixel of the image data sampled at the determined second resolution using the image data sampled at the determined second resolution and the calculated updated gradients; and
control a second display of the zoomed color pixel data on the display.

5. The computer-readable medium of claim 4, wherein the system equation is solved using an iterative process.

6. The computer-readable medium of claim 4, wherein the system equation is Lp=b, where L is a matrix that includes weights defined by $\Delta P(x,y)=P(x+1,y)+P(x-1,y)+P(x,y+1)+P(x,y-1)-4P(x,y)$, where P(x, y) is image data for a point of the sampled image data defined by indices x, y, p is the color pixel data for the point, and b encodes the calculated gradients.

7. The computer-readable medium of claim 6, wherein b further encodes boundary conditions.

8. The computer-readable medium of claim 4, wherein an initial color pixel data for each new pixel of the image data sampled at the determined second resolution is defined as an average of a first pixel and a second pixel which are neighbors of the new pixel.

9. The computer-readable medium of claim 4, wherein the computer-readable instructions further cause the computing device to receive a request to pan the displayed color pixel data in a first direction.

10. The computer-readable medium of claim 9, wherein the computer-readable instructions further cause the computing device to:
sample the image data to include second image data at the first resolution in the first direction;
calculate second updated gradients for the image data sampled to include the second image data;
solve the system equation for panned color pixel data for each pixel of the image data sampled to include the second image data using the image data sampled to include the second image data and the calculated second updated gradients; and
control a third display of the panned color pixel data on the display.

11. The computer-readable medium of claim 4, wherein the system equation is solved using a direct process.

12. The computer-readable medium of claim 4, wherein the computer-readable instructions further cause the computing device to switch to an out-of-core process if an amount of memory required to sample the image data exceeds a maximum memory limit.

13. The computer-readable medium of claim 12, wherein the out-of-core process successively samples data using a window, wherein the image data within the window is sampled at the first resolution.

14. The computer-readable medium of claim 13, wherein successive windows overlap in space.

15. The computer-readable medium of claim 12, wherein the maximum memory limit is based on an in-core memory of the computing device.

16. A method of interactive editing of image data, the method comprising:
sampling, by a computing device, image data at a first resolution, wherein the first resolution is lower than a full resolution of the image data;
calculating, by the computing device, gradients for the sampled image data;
solving, by the computing device, a system equation to define color pixel data for each pixel of the sampled image data using the sampled image data and the calculated gradients;
controlling, by the computing device, a display of the color pixel data on a display;
receiving, by the computing device, a request to zoom into a location of the displayed color pixel data;
determining, by the computing device, a second resolution of the image data based on the request;
sampling, by the computing device, the image data at the determined second resolution, wherein the determined second resolution is higher than the first resolution;
calculating, by the computing device, updated gradients for the image data sampled at the determined second resolution;
solving, by the computing device, the system equation for zoomed color pixel data for each pixel of the image data sampled at the determined second resolution using the image data sampled at the determined second resolution and the calculated updated gradients; and
controlling, by the computing device, a second display of the zoomed color pixel data on the display.

* * * * *